(12) United States Patent
Bin et al.

(10) Patent No.: US 12,038,129 B2
(45) Date of Patent: *Jul. 16, 2024

(54) SYSTEMS AND METHODS FOR PAYLOAD STABILIZATION

(71) Applicant: SZ DJI OSMO TECHNOLOGY CO., LTD., Shenzhen (CN)

(72) Inventors: Peng Bin, Shenzhen (CN); Peng Wang, Shenzhen (CN); Chengyu Yin, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 425 days.

This patent is subject to a terminal disclaimer.

(21) Appl. No.: 17/397,691

(22) Filed: Aug. 9, 2021

(65) Prior Publication Data

US 2021/0372560 A1 Dec. 2, 2021

Related U.S. Application Data

(63) Continuation of application No. 15/931,065, filed on May 13, 2020, now Pat. No. 11,085,580, which is a
(Continued)

(51) Int. Cl.
*F16M 13/04* (2006.01)
*F16M 11/12* (2006.01)
(Continued)

(52) U.S. Cl.
CPC .......... *F16M 13/04* (2013.01); *F16M 11/123* (2013.01); *F16M 11/18* (2013.01);
(Continued)

(58) Field of Classification Search
None
See application file for complete search history.

(56) References Cited

U.S. PATENT DOCUMENTS

| 5,609,316 A | 3/1997 | Tigliev |
| 6,345,799 B1 * | 2/2002 | Fusi ....................... F16M 11/18 248/327 |

(Continued)

FOREIGN PATENT DOCUMENTS

| CN | 201218391 Y | 4/2009 |
| CN | 105144695 A | 12/2015 |

(Continued)

OTHER PUBLICATIONS

The World Intellectual Property Organization (WIPO) International Search Report and Written Opinion for PCT/CN2016/073111 Oct. 26, 2016.

*Primary Examiner* — Clayton E. LaBalle
*Assistant Examiner* — Diana Hancock
(74) *Attorney, Agent, or Firm* — ANOVA LAW GROUP, PLLC

(57) ABSTRACT

A stabilizing device for stabilizing a payload includes a handle assembly, a payload stabilization assembly, and a constant force assembly. The handle assembly includes one or more grips. The payload stabilization assembly is configured to support a payload and permit the payload to rotate about at least one axis of rotation. The constant force assembly is operably connected to the handle assembly, is configured to support the payload stabilization assembly, and includes a parallelogram linkage. The parallelogram linkage includes four pivots and a resilient member obliquely arranged within the parallelogram linkage. The constant force assembly is configured to provide a force that equipoises a gravity force of the payload stabilization assembly with the payload in a vertical direction such that a net force of the payload stabilization assembly with the payload in the vertical direction is substantially zero.

20 Claims, 27 Drawing Sheets

Related U.S. Application Data continuation of application No. 16/049,198, filed on Jul. 30, 2018, now Pat. No. 10,670,183, which is a continuation of application No. PCT/CN2016/073111, filed on Feb. 1, 2016.

(51) Int. Cl.
  *F16M 11/18* (2006.01)
  *F16M 11/38* (2006.01)
  *B60R 11/04* (2006.01)

(52) U.S. Cl.
  CPC .............. *F16M 11/38* (2013.01); *B60R 11/04* (2013.01); *F16M 2200/041* (2013.01); *F16M 2200/042* (2013.01); *F16M 2200/047* (2013.01)

(56) References Cited

U.S. PATENT DOCUMENTS

| | | | |
|---|---|---|---|
| 9,404,618 B2 * | 8/2016 | Brown | F16M 11/2092 |
| 10,670,183 B2 * | 6/2020 | Bin | F16M 11/38 |
| 10,816,132 B2 * | 10/2020 | Bax | F16M 11/2014 |
| 11,085,580 B2 * | 8/2021 | Bin | F16M 11/38 |
| 2010/0018101 A1 | 1/2010 | Moody et al. | |
| 2010/0079101 A1 | 4/2010 | Sidman | |
| 2010/0238345 A1 | 9/2010 | Greb et al. | |
| 2013/0094847 A1 | 4/2013 | Di | |
| 2014/0037278 A1 * | 2/2014 | Wang | H04N 23/685 396/55 |
| 2014/0069595 A1 | 3/2014 | Chen | |
| 2014/0099092 A1 | 4/2014 | Di Leo | |
| 2015/0308618 A1 * | 10/2015 | Valero | F16M 11/10 224/265 |
| 2016/0305602 A1 | 10/2016 | Carthey | |
| 2018/0007248 A1 * | 1/2018 | Zeise | H04N 23/51 |
| 2018/0106425 A1 * | 4/2018 | Brown | G03B 17/561 |

FOREIGN PATENT DOCUMENTS

| | | |
|---|---|---|
| FR | 2418414 A1 | 9/1979 |
| GB | 2083433 A | 3/1982 |
| GB | 2519357 A | 4/2015 |
| GB | 2521865 A | 7/2015 |
| JP | S611583 U | 1/1986 |
| JP | H08109776 A | 4/1996 |
| WO | 2015022433 A1 | 2/2015 |
| WO | 2015055850 A2 | 4/2015 |

\* cited by examiner

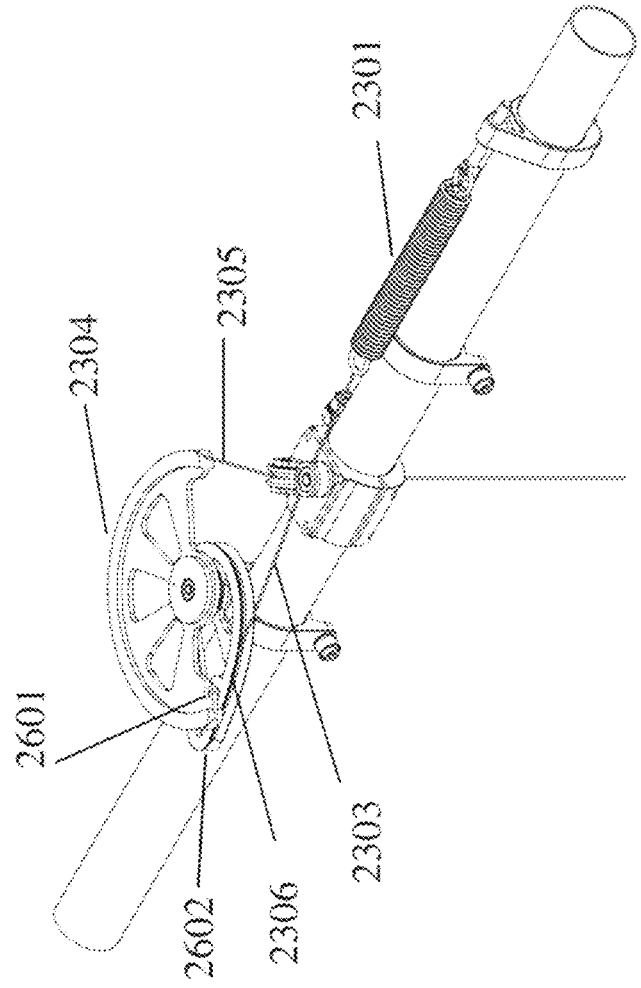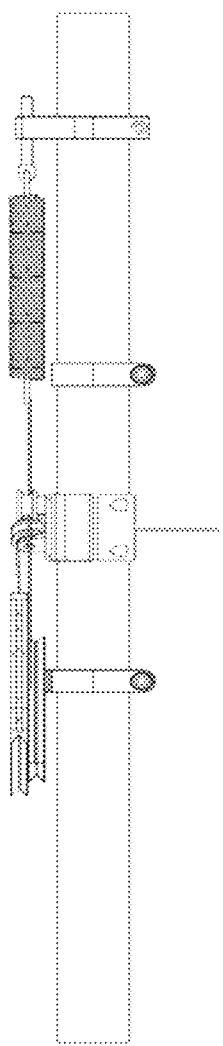
FIG. 26
FIG. 27

SYSTEMS AND METHODS FOR PAYLOAD STABILIZATION

CROSS-REFERENCE TO RELATED APPLICATIONS

This application is a continuation of U.S. patent application Ser. No. 15/931,065, filed on May 13, 2020, now U.S. Pat. No. 11,085,580, which is a continuation of U.S. patent application Ser. No. 16/049,198, filed on Jul. 30, 2018, now U.S. Pat. No. 10,670,193, which is a continuation of International Application No. PCT/CN2016/073111, filed on Feb. 1, 2016, the entire contents of all of which are incorporated herein by reference.

BACKGROUND OF THE DISCLOSURE

Payloads, including a wide range of objects, such as imaging devices, various sensors, mechanical components for performing different tasks, or cargo, may be easily subject to shaking or jitter, especially when they are held in a person's hand(s). For example, when the payload is an imaging device, such as a camera, it is likely to shoot photographs or video with noticeable shaking if no stabilizing measure is being applied. This may be adverse to high quality shooting and good user experience. Therefore, it would be desirable to provide efficient stabilizing method, devices and system for stabilizing the payloads.

SUMMARY OF THE DISCLOSURE

The stabilizing methods, devices, or systems according to the exemplary embodiments of the disclosure may be used to stabilize a payload in a coordinate system. In particular, the stabilizing methods, devices, or systems herein may diminish or eliminate jitter or shaking of a payload in a vertical direction such that a good stabilization in the vertical direction would be achieved.

An aspect of the disclosure is directed to a stabilizing device for stabilizing a payload. The stabilizing device comprises a handle assembly comprising one or more grips configured to permit a user to support the entirety of the stabilizing device using the one or more grips. The stabilizing device also comprises a payload stabilization assembly configured to support the payload and permit the payload to rotate about at least one axis of rotation. The stabilizing device further comprises a constant force assembly operably connected to the handle assembly and configured to support the payload stabilization assembly, wherein the constant force assembly is configured to provide a force that equipoises a gravity force of the payload stabilization assembly with the payload in a vertical direction such that a net force of the payload stabilization assembly with the payload in the vertical direction is substantially zero.

Another aspect of the disclosure may be directed to a method for stabilizing a payload. The method comprises supporting the payload using a payload stabilization assembly configured to permit the payload to rotate about at least one axis of rotation. The method also comprises providing a force that equipoises a gravity force of the payload stabilization assembly with the payload in a vertical direction such that a net force of the payload stabilization assembly with the payload in the vertical direction is substantially zero, using a constant force assembly (1) configured to support the payload stabilization assembly, and (2) operably connected to a handle assembly comprising one or more grips configured to permit a user to support the entirety of the stabilizing device using the one or more grips.

An additional aspect of the disclosure may be directed to a stabilizing device for stabilizing a payload. The stabilizing device comprises a handle assembly comprising one or more grips. The stabilizing device also comprises a payload stabilization assembly configured to support the payload and permit the payload to rotate about at least one axis of rotation, wherein the payload stabilization assembly is configured to permit the payload to rotate about at least one axis of rotation when directly operably connected to the handle assembly without a constant force assembly being operably connected to the handle assembly, wherein the payload stabilization assembly is configured to permit the payload to rotate about at least one axis of rotation when supported by the constant force assembly that is operably connected to the handle assembly, and wherein the constant force assembly is configured to provide a force that equipoises a gravity force of the payload stabilization assembly with the payload in a vertical direction such that a net force of the payload stabilization assembly with the payload in the vertical direction is substantially zero.

A further aspect of the disclosure may be directed to a method for stabilizing a payload. The method comprises supporting the payload using a payload stabilization assembly configured to permit the payload to rotate about at least one axis of rotation. The method also comprises permitting, via the payload stabilization assembly, the payload to rotate about at least one axis of rotation when directly operably connected to the handle assembly without a constant force assembly being operably connected to the handle assembly. The method further comprises permitting, via the payload stabilization assembly, the payload to rotate about at least one axis of rotation when supported by the constant force assembly that is operably connected to the handle assembly, wherein the constant force assembly is configured to provide force that equipoises a gravity force of the payload stabilization assembly with the payload in a vertical direction such that a net force of the payload stabilization assembly with the payload in the vertical direction is substantially zero.

An aspect of the disclosure may be directed to a constant force assembly configured for use in a stabilizing device for stabilizing a payload. The constant force assembly comprises a first interface permitting the constant force assembly to be detachably connected to a handle assembly of the stabilizing device, wherein the handle assembly comprises one or more grips. The constant force assembly also comprises a second interface permitting the constant force assembly to be detachably connected to a payload stabilization assembly of the stabilizing device and configured to support the payload stabilization assembly, wherein the payload stabilization assembly is configured to support the payload and permit the payload to rotate about at least one axis of rotation. The constant force assembly further comprises a constant force mechanism configured to provide a force that equipoises a gravity force of the payload stabilization assembly with the payload in a vertical direction such that a net force of the payload stabilization assembly with the payload in the vertical direction is substantially zero.

Another aspect of the disclosure may be directed to a method of using a constant force assembly to stabilize a payload. The method comprises permitting the constant force assembly to be detachably connected to a handle assembly of a stabilizing device using a first interface of the constant force assembly, wherein the handle assembly comprises one or more grips. The method also comprises permitting the constant force assembly to be detachably connected to a payload stabilization assembly of the stabilizing device using a second interface of the constant force assembly, wherein the payload stabilization assembly is configured to support the payload and permit the payload to rotate about at least one axis of rotation. The method further comprises providing a force, using the constant force assembly, that equipoises a gravity force of the payload stabilization assembly with the payload in a vertical direction such that a net force of the payload stabilization assembly with the payload in the vertical direction is substantially zero.

An additional aspect of the disclosure may be directed to a stabilizing device for stabilizing a payload. The stabilizing device comprises a handle assembly comprising one or more grips. The stabilizing device also comprises a payload stabilization assembly configured to support the payload and permit the payload to rotate about at least one axis of rotation. The stabilizing device further comprises a constant force assembly operably connected to the handle assembly and configured to support the payload stabilization assembly, wherein the constant force assembly is configured to provide a force that equipoises a gravity force of the payload stabilization assembly with the payload in a vertical direction such that a net force of the payload stabilization assembly with the payload in the vertical direction is substantially zero, wherein the constant force assembly comprises a parallelogram linkage which includes four pivots and a resilient member obliquely arranged within the parallelogram linkage, and one attachment point of the resilient member is displaced in a horizontal direction by a negative offset distance from a vertical plane passing through longitudinal axes of two of four pivots that are adjacent to the handle assembly.

A further aspect of the disclosure may be directed to a method for stabilizing a payload. The method comprises supporting the payload using a payload stabilization assembly configured to permit the payload to rotate about at least one axis of rotation. The method also comprises providing a force that equipoises a gravity force of the payload stabilization assembly with the payload in a vertical direction such that a net force of the payload stabilization assembly with the payload in the vertical direction is substantially zero, using a constant force assembly (1) configured to support the payload stabilization assembly, and (2) operably connected to a handle assembly comprising one or more grips, wherein the constant force assembly comprises a parallelogram linkage which includes four pivots and a resilient member obliquely arranged within the parallelogram linkage, and one attachment point of the resilient member is displaced in a horizontal direction by a negative offset distance from a vertical plane passing through longitudinal axes of two of four pivots that are adjacent to the handle assembly.

Other objects and features of the disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 26 shows a perspective view of a constant force assembly in accordance with an embodiment of the disclosure;

FIG. 27 shows a lateral view of the constant force assembly as illustrated in FIG. 26;

DETAILED DESCRIPTION OF THE EMBODIMENTS

Figure 1:
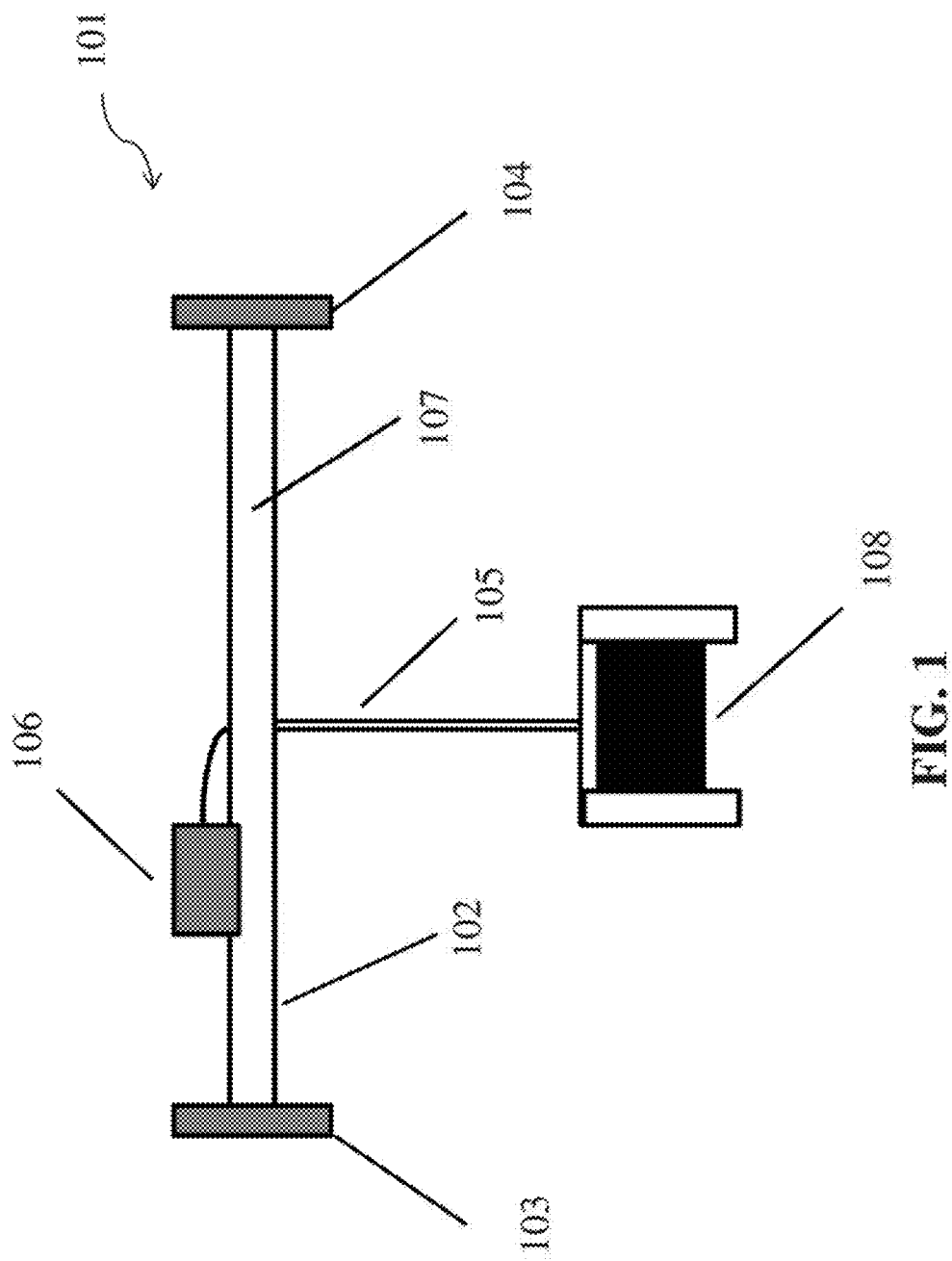
FIG. 1 shows a high-level schematic diagram of a stabilizing device in accordance with embodiments of the disclosure.

The systems, devices, and methods of the disclosure may enable stabilization of a payload in multiple directions, especially in a vertical direction. In particular, the systems, devices and methods of the disclosure may provide a stabilizing device capable of providing a constant force that may be used for equipoising a gravity force of an object including a payload to be stabilized in the vertical direction. In this way, a resulting net force of the object in the vertical direction is substantially zero during this balancing or stabilizing process. Therefore, the stability of the payload may be significantly improved since the jitter or shaking due to gravitational effects could be diminished or eliminated, thereby allowing an operator to capture videography or cinematography in a stable manner.

The stabilizing device herein may include a handle assembly, a payload stabilization assembly and a constant force assembly. The handle assembly may comprise one or more grips configured to permit a user to hold the stabilizing device. The one or more grips may be adjustably connected to a top handle bar or a cross bar of the handle assembly. In some instances, the handle assembly may comprise a single grip that allows a user to hold the stabilizing device using only one hand. The single grip may be pivoted such that it may have different orientations, for example, in accordance with the user's preferences. In some embodiments, the handle assembly may be configured to have a variable orientation relative to the constant force assembly. In addition, the handle assembly may be used as a handle for the payload after the handle assembly is disconnected from the constant force assembly and directly attached to the payload. As such, the handle assembly may be flexibly and/or directly connected with the payload for the user to hold when stabilization is not needed. Additionally, the handle assembly may be disconnected from the payload and then connected to the other components of the stabilizing device for stabilization purposes, for example, to prevent or reduce floating and/or shaking of the payload.

The handle assembly described herein may be electrically connected with other parts of the stabilizing device. A user can use the handle assembly to control the stabilizing device in a variety of ways. For example, the handle assembly may include a number of control buttons for controlling the movement of the payload, such as the rotation, translation, tilt, ascent, descent, etc. This would be advantageous when the payload is an imaging device, such as a camera configured to follow an object of interest while shooting, since the quality of the photography/videography can be improved by reducing the jitter or shaking of the camera in the vertical direction. Additionally, the handle assembly may be moved such that the stabilizing device may have different form factors, thereby improving the portability and flexibility of the stabilizing device.

The payload stabilization assembly herein may be configured to support the payload and permit the payload to rotate about at least one axis of rotation. To adequately support the payload, the payload stabilization assembly may include different mechanical structures for stabilizing the payload stable to avoid jitters or wobbles in a horizontal direction. In some embodiments, the payload stabilization assembly may comprise a support bar, a linkage mechanism and multiple support plates that collectively forms a claw-like structure for supporting the constant force assembly and the payload, such that the payload can move steadily in the vertical direction. The support bar may support the linkage mechanism which may then carry or support the payload. The payload stabilization assembly may further include a multiple-axis gimbal coupled to the payload, that allows the payload to rotate about multiple axes, for example, in a pitch, a yaw or a roll axis, or any combination thereof.

The constant force assembly herein may be operably connected to the handle assembly and configured to support the payload stabilization assembly. Further, the constant force assembly may be configured to provide a force that equipoises a gravity force of the payload stabilization assembly with the payload in a vertical direction, such that a net force of the payload stabilization assembly with the payload in the vertical direction is substantially zero. In some embodiments, the constant force assembly may comprise a parallelogram linkage with a resilient member (such as a plurality of springs) positioned proximately along a diagonal of the parallelogram linkage and four pivots positioned respectively at the four corners of the parallelogram linkage. Attachment points of the resilient member may be selected such that different forces may be generated for supporting the payload to counteract gravitational force in the vertical direction. In some embodiments, the resilient member may be a constant force spring. The constant force spring may comprise a tension spring comprising a rolled metal strip and a spool. Additionally or alternatively, the constant force spring may comprise a volute spring connected with a spiral cam.

The stabilizing device as described above may further include a variety of sensors. The sensors may recognize movement of the handle assembly, the payload, and the constant force assembly. The sensors may be attached to the handle assembly, frame components, and/or actuator mechanisms, such as one or more motors. The sensors may communicate information to a processor on board or off board the stabilizing device. The processor may use the information from the sensors to detect a change in the orientation of the handle assembly and the payload and cause a subsequent change in the orientation and/or control of at least one of the motors on the stabilization device.

Embodiments of the disclosure are described below with reference to the accompanying drawings.

FIG. 1 shows a high level schematic of a stabilizing device 101 in accordance with an embodiment of the disclosure. The stabilizing device 101 may include a handle assembly 102 which may include one or more grips 103 and 104, a payload stabilization assembly 105, and a constant force assembly 106. As shown in FIG. 1, the handle assembly may also comprise a top handle bar 107. The payload stabilization assembly and the constant force assembly may be carried by or detachably attached to the top handle bar. The stabilizing device may be configured to stabilize a payload 108 in various directions, especially in a vertical direction.

The handle assembly may be made from a metallic, composite, or plastic material, such as carbon fiber. In some embodiments, the grips mounted to the top handle bar of the handle assembly may be adjustable to provide comfort for the user's grip. The number of grips may be provided based on one or more factors, such as a size, volume, height of the payload to be stabilized, different application requirements and the like. For example, for light or small payloads, a single grip, such as the grip shown in FIGS. 33 and 34, may be sufficient for holding and stabilizing purposes. Conversely, for heavy payloads, an additional grip may be mounted to the top handle bar, for example at the middle portion of the top handle bar.

Depending on the type of applications, control buttons may or may not be provided on the handle assembly for controlling the stabilizing device. For example, in some embodiments, such as a handle assembly with two grips, control over the payload may be implemented using one or more sensors or actuator mechanisms on board the stabilizing device. Alternatively, control over the payload may be implemented using a remote controller via wired or wireless communications. In some embodiments in which the handle assembly has a single grip, such as the grip shown in FIGS. 33 and 34 and FIGS. 42 and 43, a plurality of control buttons may be provided on the handle assembly as a control panel. In this way, the user can control the operations of the payload while the payload is working, such as shooting or taking photos, when the payload is a camera.

The top handle bar, which may act as a frame assembly, may have a plurality of frame components. The frame components may be rigid parts. The frame components may be configured to move relative to each other. The movement of the components may be about a joint. For example, the joint may be a hinge, ball and socket, plane joint, saddle, or pivot. Movement of the frame components may be controlled by one or more motors. Optionally, one or more motors may be provided at the joints between the components. Each frame component may be moved by one motor or a plurality of frame components may be moved by a single motor. Frame components may be rotated about an axis. Each component may rotate about one, two, three, or more axes. The axis of rotation may be defined in a fixed or non-fixed reference frame. Additionally, the frame components may be configured to translate in at least one direction. The joints may further comprise Hall sensors which may detect the position, and/or rotation of the frame components relative to each other at each joint location.

The payload stabilization assembly may be used for stabilizing the payload such that the payload moves substantially in a vertical direction, instead of floating or moving around. Therefore, the payload stabilization assembly may include a vertical moving linkage to ensure vertical translation of the payload. The vertical moving linkage may be configured to restrict unwanted movement of the payload. For example, in some embodiments, the vertical moving linkage may be implemented as a claw-like structure, such as those shown in FIGS. 9-13, as described in detail later in the specification. In some embodiments, the payload stabilization assembly may be implemented as a guiding structure, for example as shown in in FIG. 14. The structure of the payload stabilization assembly may be further simplified, for example, to a support plate or base for supporting the payload, such as those shown in FIGS. 42 and 43.

The constant force assembly may be operably connected to the handle assembly, for example, the top handle bar of the handle assembly, and may be configured to support the payload stabilization assembly. As mentioned before, the constant force assembly may be configured to provide a force that equipoises a gravity force of the payload stabilization assembly with the payload in a vertical direction, such that a net force of the payload stabilization assembly with the payload in the vertical direction may be substantially zero. The force as provided may be a resilient force generated by any suitable resilient members. Therefore, the constant force assembly may be designed to have different structures for providing such a constant force.

Figure 34:
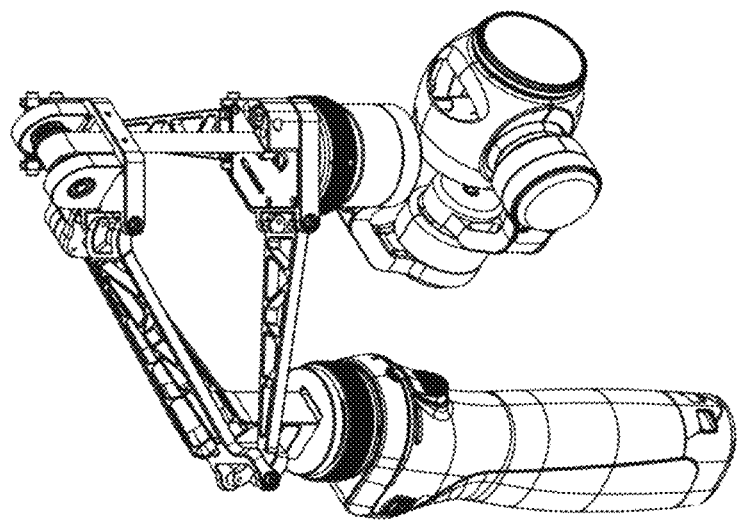
FIG. 34 shows another perspective view of the stabilizing device as illustrated in FIG. 33.
Figure 33:
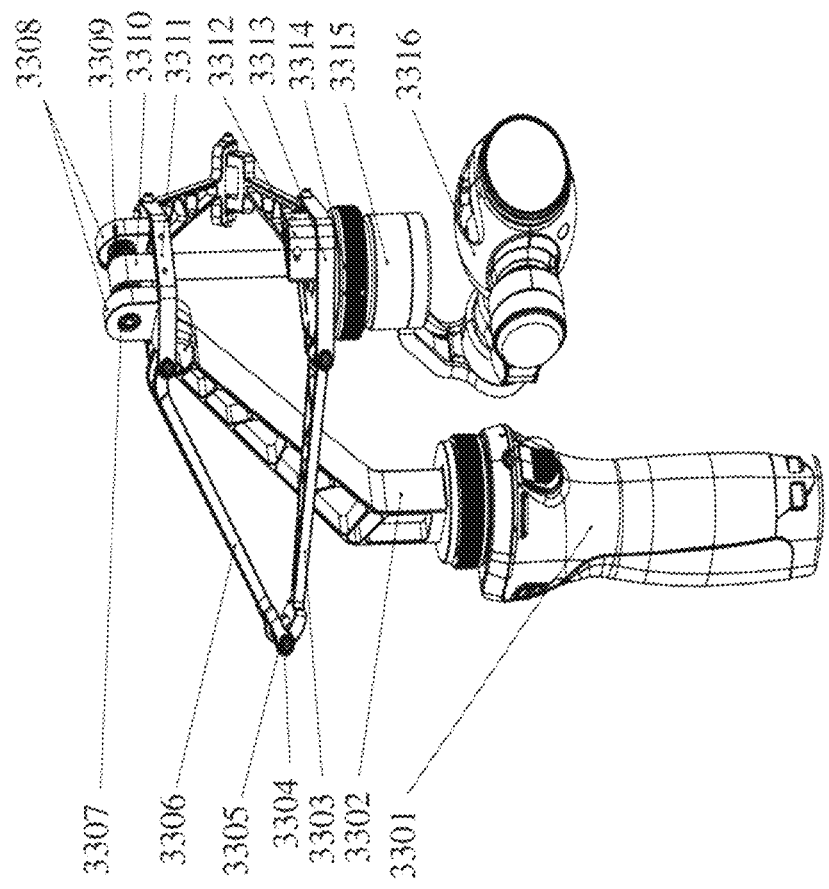
FIG. 33 shows a perspective view of a stabilizing device in accordance with an embodiment of the disclosure.
Figure 35:
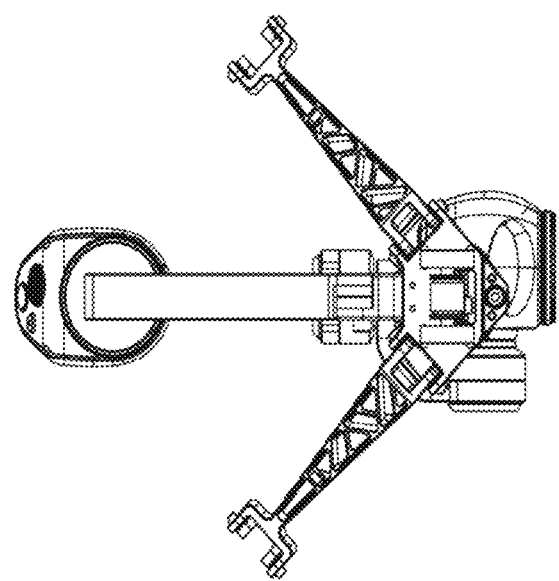
FIG. 35 shows a top view of the stabilizing device as illustrated in FIG. 33.
Figure 37:
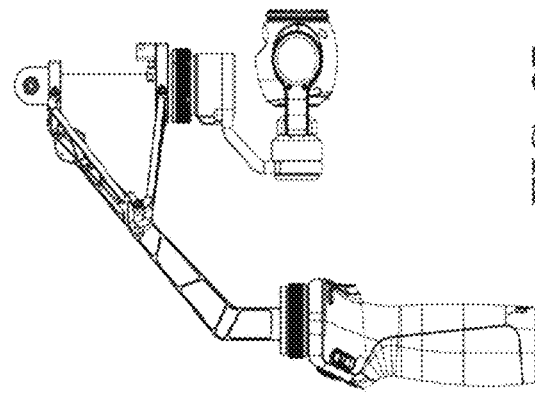
FIG. 37 shows a lateral view of the stabilizing device as illustrated in FIG. 33.
Figure 36:
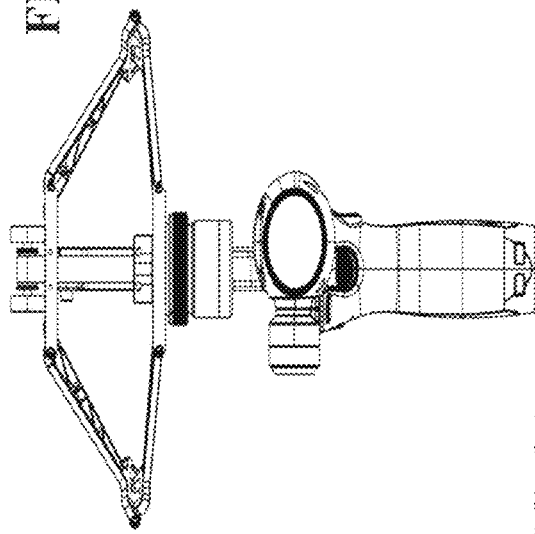
FIG. 36 shows a front view of the stabilizing device as illustrated in FIG. 33.

In some embodiments, the constant force assembly may be implemented having a volute spring connected with a spiral cam. The resilient force output by the volute spring may equipoise the gravity force of the payload stabilization assembly and the payload, such that a net force of the payload stabilization assembly with the payload in the vertical direction is substantially zero. One possible design of a volute spring and a spiral cam is shown in FIGS. 2-8. Additionally or alternatively, a driving unit or mechanism, such as a motor, may be added to drive the payload together with the payload stabilization assembly to return or stop at an expected position. In some embodiments, the constant force assembly may be designed as a combination of a tension spring and a rotatable wire spool, one example of which is illustrated in FIGS. 23-31. In some embodiments, the constant force assembly may be implemented having a constant force spring which may be capable of exerting a substantially constant force over its entire range of extension to counteract the gravitational force on the payload stabilization assembly with the payload. One possible design of a constant force spring is shown in FIGS. 33 and 34, which will be described in detail later in the specification. The constant force spring may be further driven by a driving unit, such as a motor, to move the payload stabilization and the payload to return or stop at an expected position. An example of this actuation is illustrated in FIGS. 38-41.

The payload may be supported or carried by the payload stabilization assembly, and directly or indirectly connected with the constant force assembly. The payload may be, for example, a camera, a sensor, a passenger, or cargo. In some instances, when embodied as a sensor, the payload may comprise: location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Sensors of different types may measure different types of signals or information (e.g., position, orientation, velocity, acceleration, proximity, pressure, etc.) and/or utilize different types of measurement techniques to obtain data.

In an example, the payload may include a camera. The camera may be a film or digital camera. The camera may be able to capture video recordings or still photographs. The camera may be a micro lens camera, a point and shoot camera, a mobile phone camera, a professional video camera, or a camcorder. The camera settings may be controlled by the user via a remote control or user input components built into the stabilizing device. Examples of camera settings may be white balance, aperture size, shutter speed, focal length, zoom, or ISO sensitivity. Further, to enable the camera to shoot in any direction, a gimbal supporting multiple-axis rotation may be introduced to support or carry the camera. In this manner, when performing the stabilizing operations described elsewhere herein, the stabilizing device carrying the camera may permit the operator to capture videography or cinematography in a stable manner.

The processor may be configured to automatically calculate and/or determine a desired payload orientation without requiring additional input from an external device or user. In some instances, the desired payload orientation may remain substantially constant with respect to the top handle bar or frame assembly used as a reference frame. Alternatively, the desired payload orientation may change with respect to the top handle bar. In other embodiments, the desired payload orientation may be calculated and/or determined based on a signal received from an external device, such as a remote control. Similarly, the desired payload orientation may be calculated and/or determined based on a signal received from a user input interface of the handle assembly, such as one or more control buttons arranged on the handle assembly. For example, the operator of the stabilization platform or another individual operating an external device or remote control may provide input regarding the orientation of the payload with respect to the top handle bar.

Figure 2:
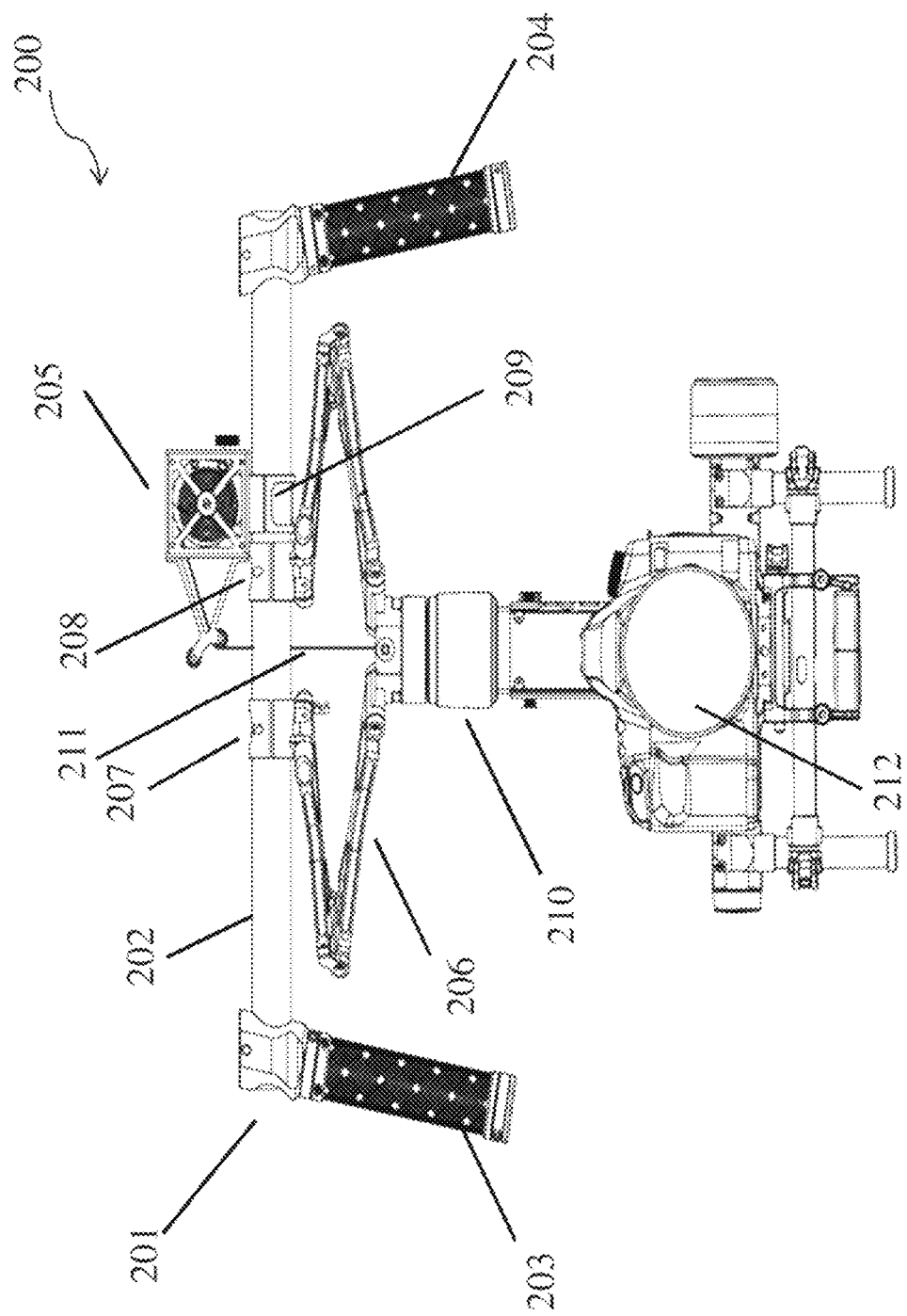
FIG. 2 shows a front view of a stabilizing device in accordance with an embodiment of the disclosure.

FIG. 2 shows a front view of a stabilizing device 200 in accordance with an embodiment of the disclosure. The stabilizing device may comprise a payload stabilization assembly having a claw-like structure, a constant force assembly comprising a cam and a volute spring, and a handle assembly including a top handle bar and two grips each mounted at the corresponding end of the top handle bar.

Figure 4:
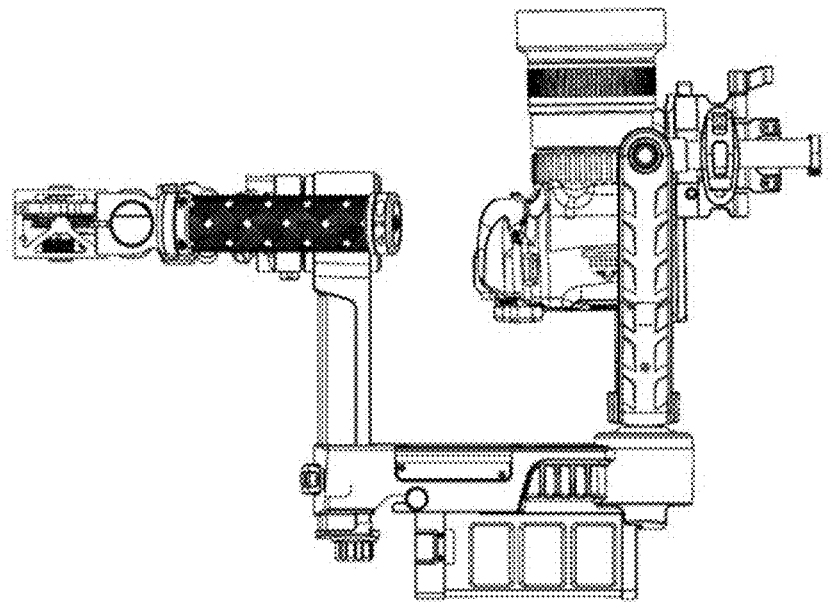
FIG. 4 shows a lateral view of the stabilizing device as illustrated in FIG. 2.
Figure 3:
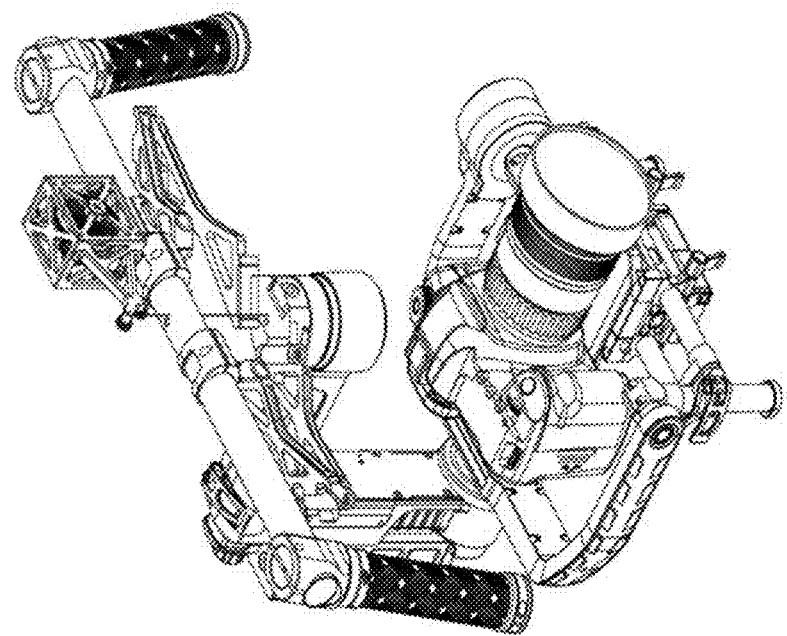
FIG. 3 shows a perspective view of the stabilizing device as illustrated in FIG. 2.

As illustrated in FIG. 2, the stabilizing device 200 may include a handle assembly 201 having a top handle bar 202 and two grips 203 and 204, a constant force assembly 205, and a payload stabilization assembly 206 mounted on and supported by the top handle bar via pipe clamps 207-209. A gimbal 210, as a payload for the stabilizing device, may be detachably connected to the payload stabilization assembly. The gimbal may be further connected with the constant force assembly by a drawing member 211, such as a bracing wire, a steel cable, or a pulling line at an output end of the constant force assembly. The gimbal may be configured to carry a camera 212, which may be able to rotate in one or more (e.g., three) different axes based on the driving forces from the gimbal. The lifting power or support force from the payload stabilization assembly and the constant force assembly can equipoise the gravity force exerted on the payload including the gimbal and the camera connected thereto with the payload stabilization assembly, thereby balancing and stabilizing the camera in a vertical direction. For a better understanding of the stabilizing principles of the disclosure, FIGS. 3 and 4 are also provided which show a perspective view of the stabilizing device and a lateral view of the stabilizing device as illustrated in FIG. 2, respectively.

The following will discuss the details of one example of the constant force assembly as above with reference to FIGS. 5-8.

Figure 5:
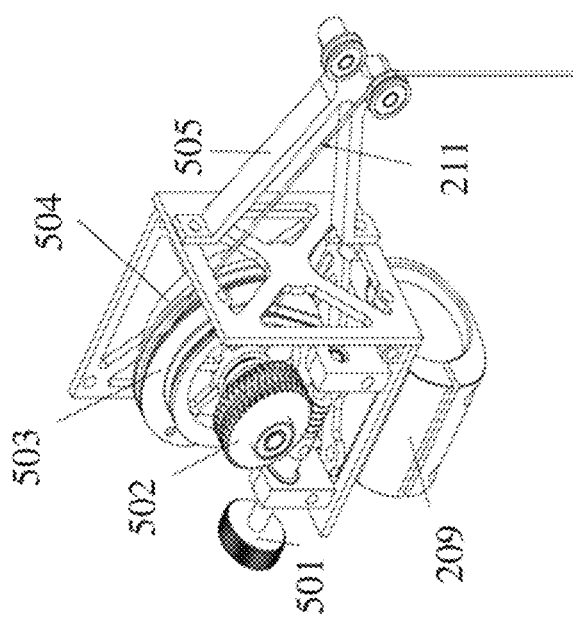
FIG. 5 shows a perspective view of a constant force assembly including a cam and a spring in accordance with an embodiment of the disclosure.

FIG. 5 shows a perspective view of a constant force assembly including a cam and a spring in accordance with an embodiment of the disclosure. The constant force assembly depicted in FIG. 5 may be similar to the constant force assembly 205 shown in FIG. 2. As shown in FIG. 5, the constant force assembly may include a pipe clamp 209 for securing the constant force assembly to a top handle bar, a manual adjustment knob 501 with a lead screw, a worm and gear 502, a spiral cam 503, a volute spring 504, a bracing wire support bracket 505, and a bracing wire 211 for connecting the payload or the payload stabilization assembly. The spiral cam and the volute spring may be connected to each other by a screw or a stop block. By adjusting the manual adjustment knob, the worm and gear may pre-tighten the volute spring. Upon pre-tightening operations by the worm and gear via the manual adjustment knob, the volute spring may have a preload force, which may drive the spiral cam to pull the bracing wire, thereby transferring a resilient force of the volute spring into a pulling force transferred by the bracing wire for counteracting the gravitational force on the payload and the payload stabilization assembly. For further clarity, FIG. 6 is provided to illustrate a back view of the constant force assembly and FIG. 7 is provided to illustrate a different perspective view of the constant force assembly.

Figure 6:
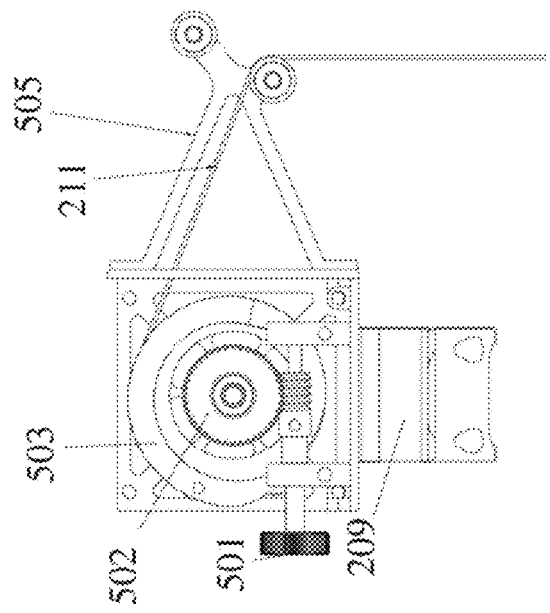
FIG. 6 shows a back view of the constant force assembly as illustrated in FIG. 5.
Figure 7:
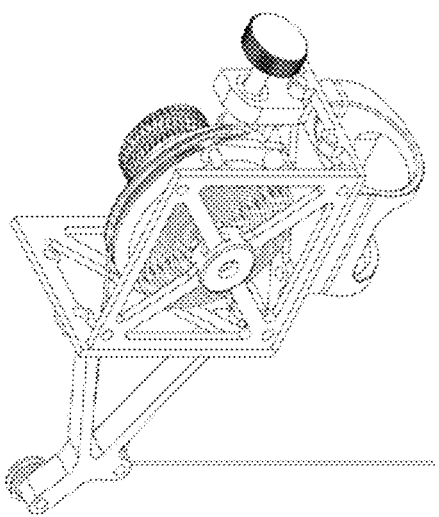
FIG. 7 shows another perspective view of the constant force assembly as illustrated in FIG. 5.
Figure 8:
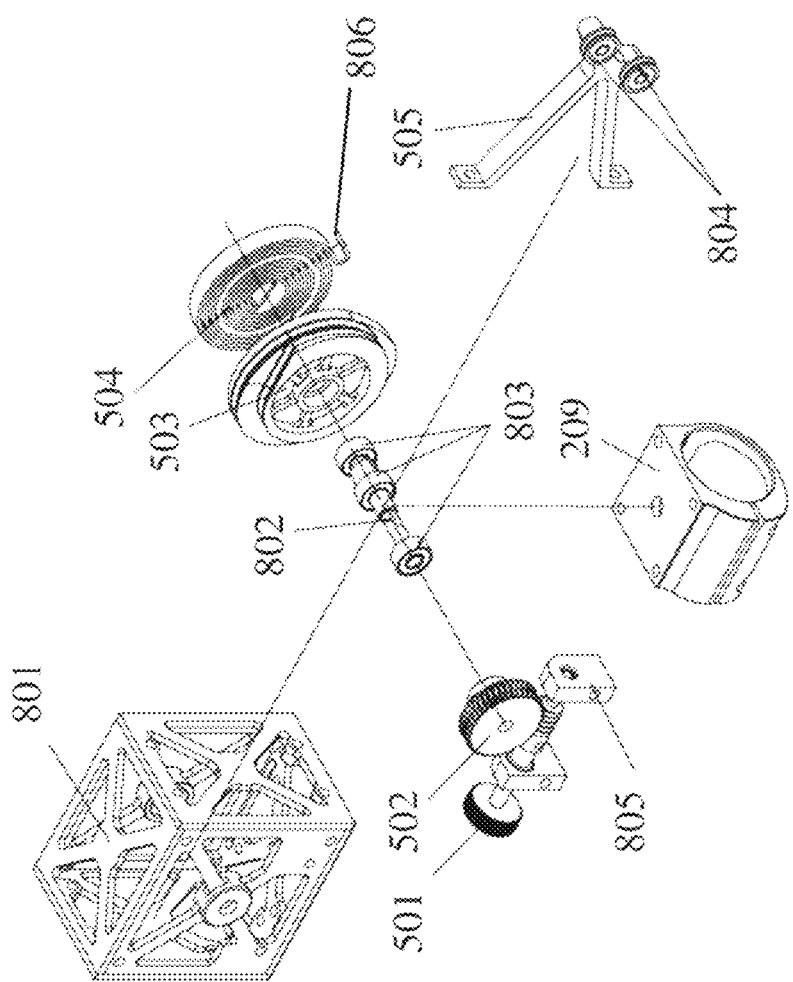
FIG. 8 shows an exploded view of the constant force assembly as illustrated in FIG. 5.

FIG. 8 shows an exploded view of the constant force assembly including the cam and the spring illustrated in FIGS. 5-7 in accordance with an embodiment of the disclosure. As illustrated in FIG. 8, the constant force assembly herein may include a box or housing 801 for enclosing the worm and gear 502, the spiral cam 503, and the volute spring 504, resulting in easy installation and carrying (greater portability). Further illustrated in FIG. 6 are one or more bearings 804 for supporting the bracing wires, two bearing fixed blocks 805 for securing and supporting the lead screw, a spring fixing shaft 802 for securing the volute spring, and multiple bearings 803 for connecting the worm and gear, the spiral cam and the volute spring together. For example, the spiral cam and the volute spring may be connected with each other by a screw, a clip, a fastener, or other mechanical connection mechanism at a location indicated by 806. The volute spring may be pivotally connected with the worm and gear assembly such that the manual adjustment knob may manually adjust the volute spring via the worm and gear assembly. Through the force applied by the worm and gear assembly, the volute spring may have an initial resilient force or preload force, which may be transferred to the spiral cam. A drawing member, such as the bracing wire (e.g., steel cables) as illustrated herein may be attached to the spiral cam and wound around the spiral cam, and directly connect or indirectly connect via the payload stabilization assembly to the payload. In this way, the resilient force provided by the volute spring may be converted into a constant pulling force for equipoising the gravity force of the payload with the payload stabilization assembly, such that a net force of the payload stabilization assembly with the payload in the vertical direction is substantially zero.

Since the volute spring can provide variable forces and the force keeps increasing as the volute spring stretches (i.e., rotates), in order to obtain a constant torque which may produce a constant force to equipoise a corresponding gravity force, a radius of the spiral cam should be designed accordingly. For example, when the volute spring generates a relatively big force due to its elastic deformation or rotation, the spiral cam should be designed as having a corresponding small radius. Likewise, when the volute spring generates a relatively small force due to its elastic deformation or retraction, the spiral cam should be designed as having a corresponding big radius. In this manner, a constant torque may be generated for counteracting the gravity force from the payload and the payload stabilization assembly. Thus, in some embodiments, a formation (e.g., a shape having variable radiuses) of the spiral cam may be designed based on a relationship between a resilient force and a rotation angle of the volute spring, thereby allowing a close fit or matching between the spiral cam and the volute spring.

An example of the constant force assembly has been described above with reference to FIGS. 5-8. The following will describe in detail, with reference to FIGS. 9 and 10, one example of the payload stabilization assembly illustrated in FIGS. 2-4, i.e., a claw-like structure comprising multiple pairs of link bars.

Figure 9:
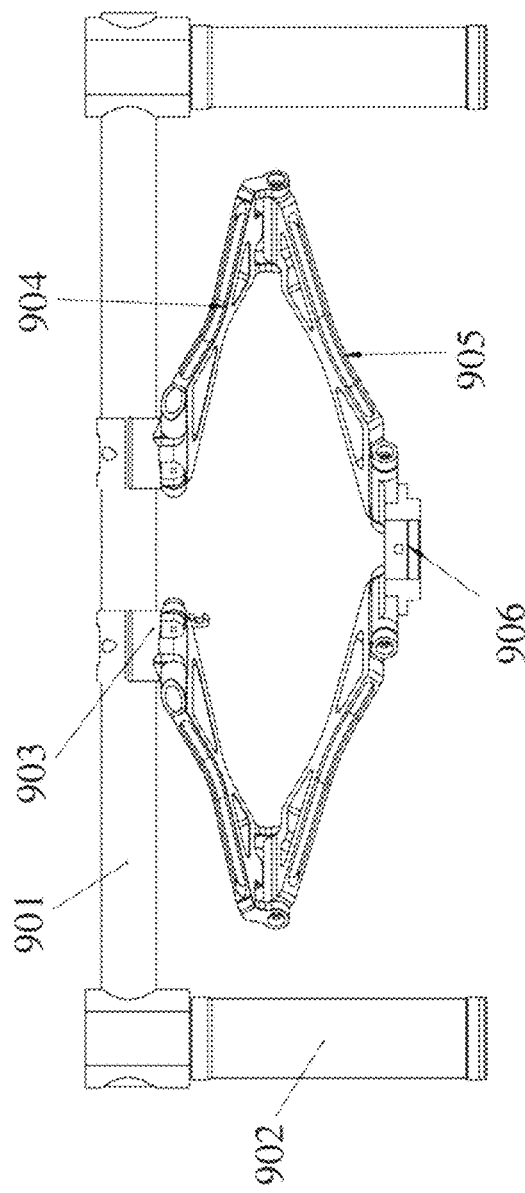
FIG. 9 shows a front view of a payload stabilization assembly being mounted on a handle assembly in accordance with an embodiment of the disclosure.

FIG. 9 shows a front view of a payload stabilization assembly being mounted on a handle assembly in accordance with an embodiment of the disclosure. The payload stabilization assembly in FIG. 9 may be similar to the payload stabilization assembly 206 shown in FIG. 2. As previously described, in some embodiments, the payload stabilization assembly may include a vertical moving linkage to ensure or permit the payload to move steadily in the vertical direction, instead of shifting or deviating from the vertical direction.

Figure 10:
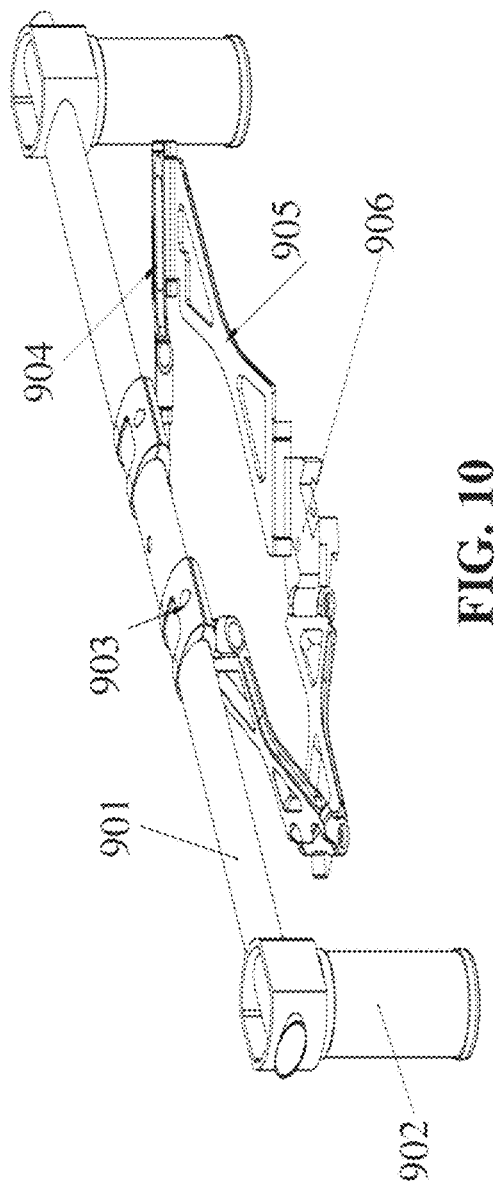
FIG. 10 shows a perspective view of the payload stabilization assembly being mounted on the handle assembly as illustrated in FIG. 9.

The vertical moving linkage depicted in FIG. 9 may comprise two pairs of link bars, each pair of link bars including an upper link bar 904 and a lower link bar 905. One end of the upper link bar and one end of the lower link bar may be pivotally connected at a variable angle and another end of the upper link bar may be secured or attached to the top handle bar 901 by a pipe clamp 903. Another end of the lower link bar may be attached to a support platform 906, to which the payload may be detachably connected. An attachment point or hole may be arranged on the support platform such that the drawing member, e.g., the bracing wire or steel cable, may be tied to the attachment point or passed through the hole and attached beneath the support platform. In this manner, when the user is holding the grips 902, unstable movement in the vertical direction may be counteracted by the lifting power generated by the constant force assembly. The connecting configurations illustrated in FIG. 9 are only for illustrative purposes, and it is understood that there are other suitable connecting approaches to connect the upper link bar and low link bar together or connect the link bar to the top handle bar or the support platform. For example, other than the hinged connection (that connects between the upper and lower link bars), a threaded connection, a bearing connection or a clamp connection may be selectively used to connect the link bars, the support platform, and the top handle bar together. For a better understanding of the vertical moving linkage, FIG. 10 is provided to show another perspective view of the payload stabilization assembly being mounted on the handle assembly as illustrated in FIG. 9, with more details about the vertical moving linkage.

Figure 11:
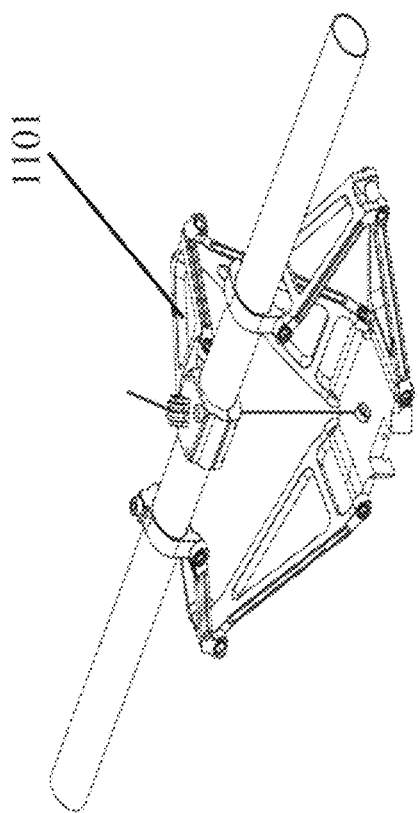
FIG. 11 shows a perspective view of a payload stabilization assembly being mounted on a handle assembly in accordance with another embodiment of the disclosure.
Figure 13:
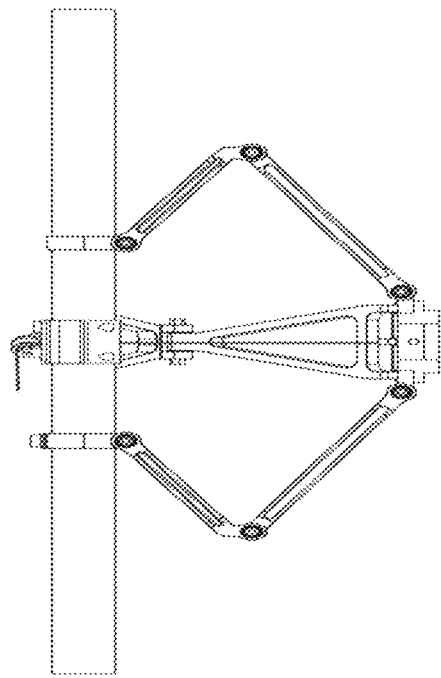
FIG. 13 shows a front view of the payload stabilization assembly being mounted on the handle assembly as illustrated in FIG. 11.
Figure 12:
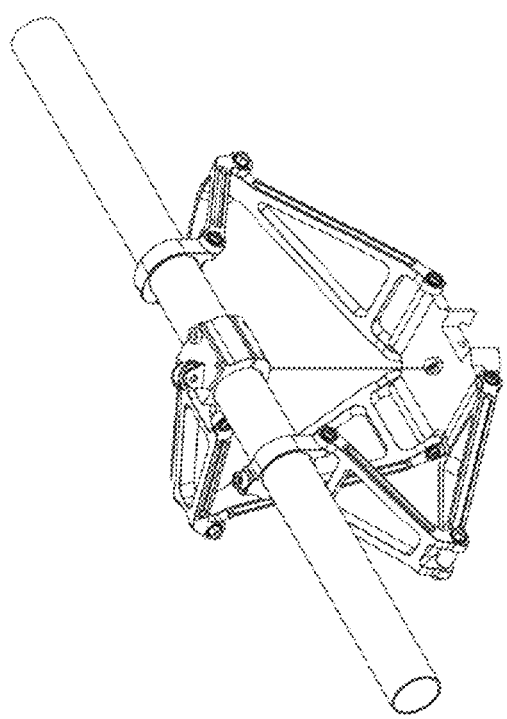
FIG. 12 shows another perspective view of the payload stabilization assembly being mounted on the handle assembly as illustrated in FIG. 11.

FIG. 11 shows a perspective view of a payload stabilization assembly being mounted on a handle assembly in accordance with another embodiment of the disclosure. It can be seen that the vertical moving linkage as illustrated in FIG. 11 may be similar to the one shown in FIG. 10, except for an additional (or a third) pair of link bars 1101 whose longitudinal section may be perpendicular to the top link bar. The other two pairs of link bars may be symmetrical about the longitudinal section of the additional (or third) pair of link bars. The pair of link bars 1101 may also be connected to the top handle bar by a pipe clamp or any other suitable fasteners. The lower link bar of the link bars 1101 may also be connected to the support platform. By introducing an additional pair of link bars, the stabilizing effect can be increased and the jitter or shaking caused by a payload with a heavy weight in the horizontal direction can be reduced. For further clarity, FIGS. 12 and 13 are provided which respectively show additional details of the three pairs of link bars, wherein FIG. 12 shows another perspective view of the payload stabilization assembly and FIG. 13 shows a front view of the payload stabilization assembly as illustrated in FIG. 11.

Figure 14:
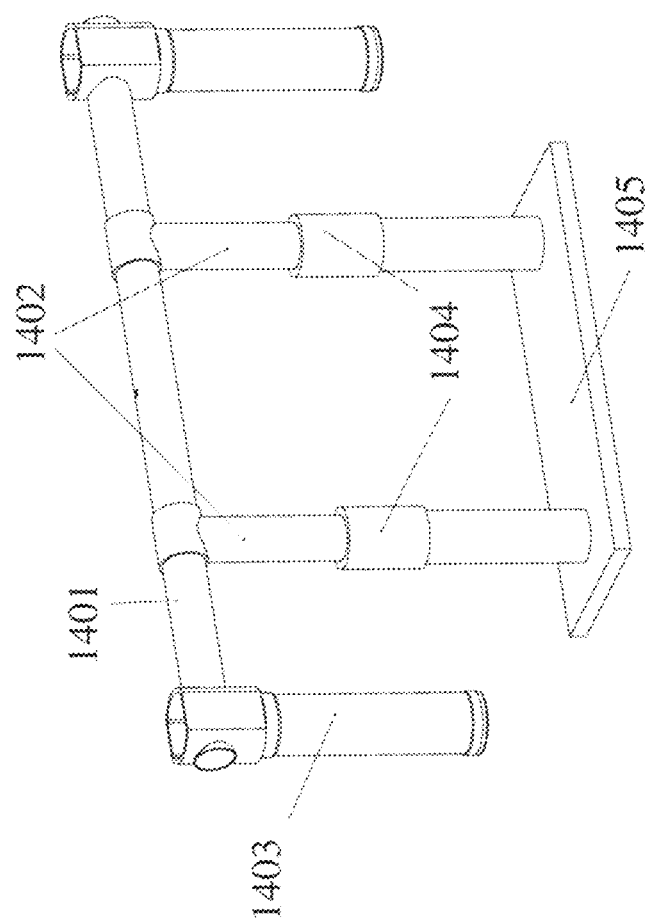
FIG. 14 shows a perspective view of a payload stabilization assembly being mounted on the handle assembly in accordance with an embodiment of the disclosure.

FIG. 14 shows a perspective view of a payload stabilization assembly being mounted on the handle assembly in accordance with an embodiment of the disclosure. In particular, the payload stabilization assembly depicted in FIG. 14 may include a guiding rail mechanism which may comprise parallel upper guiding rails 1402 and parallel lower guiding rails 1404, wherein the upper guiding rails may be sheathed into the lower guiding rail which may act as a sliding block and move a support platform 1405 in the vertical direction, for example, when the user holds grips 1403. For example, in some embodiments, one end of the guiding rail is connected with a top handle bar 1401 and another end of the guiding rail is operably connected with the payload, for example via a support platform. In some embodiments, instead of arranging two opposite guiding rails, a single one guiding rail may be used to direct the payload to move stably in the vertical direction. For example, a gimbal for supporting multiple-axis rotation may be coupled to the support platform and a camera connected with the gimbal may move up and down based on the lifting power provided by the constant force assembly, equipoising the vertical jitter caused by the gravity forces of the camera, the lower guiding rails, and the support platform.

Figure 15:
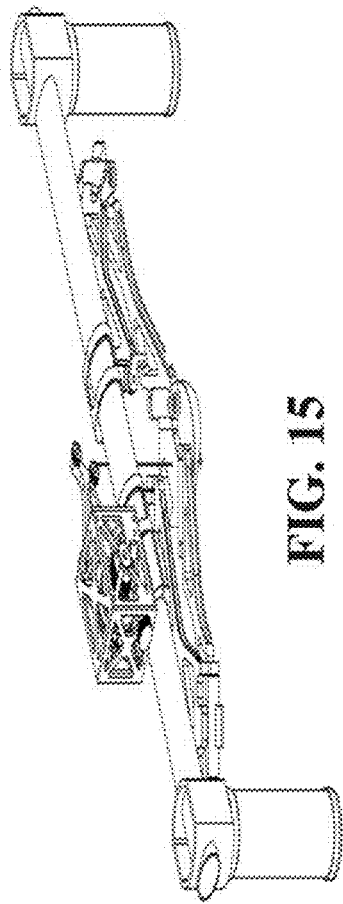
FIG. 15 shows a perspective view of a stabilizing device in accordance with an embodiment of the disclosure.
Figure 16:
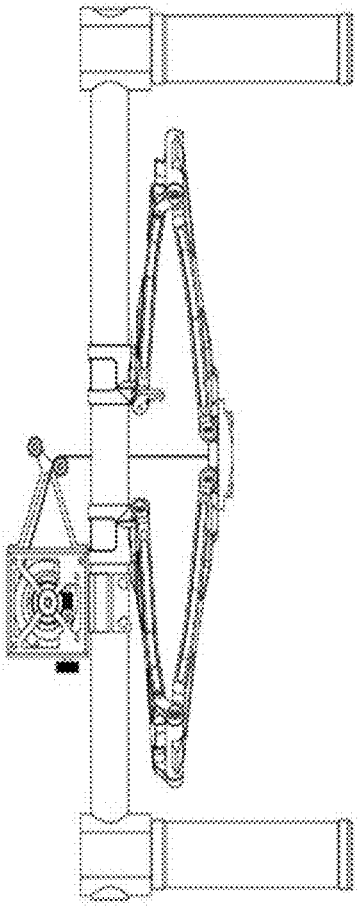
FIG. 16 shows a front view of the stabilizing device as illustrated in FIG. 15.
Figure 18:
FIG. 18 shows a top view of the stabilizing device as illustrated in FIG. 15.
Figure 17:
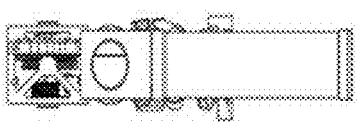
FIG. 17 shows a lateral view of the stabilizing device as illustrated in FIG. 15.
Figure 19:
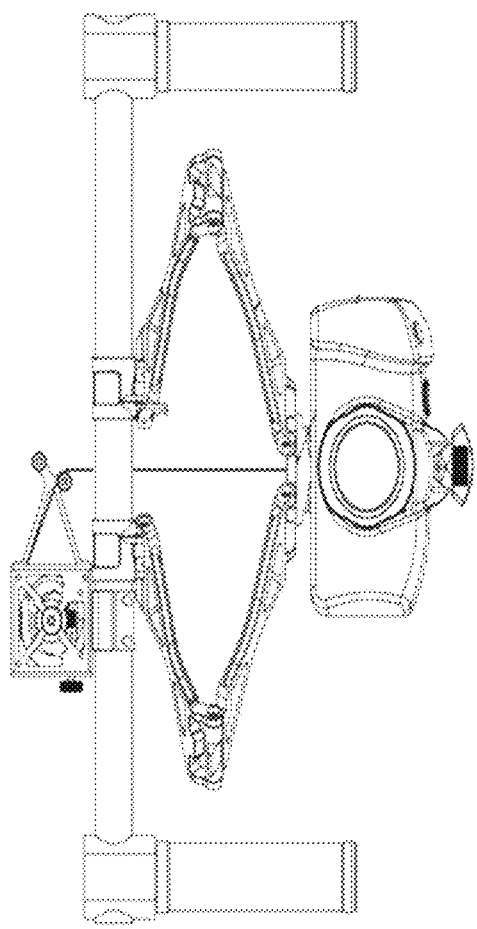
FIG. 19 shows a front view of the stabilizing device as illustrated in FIGS. 15-18 carrying a payload in accordance with an embodiment of the disclosure.
Figure 20:
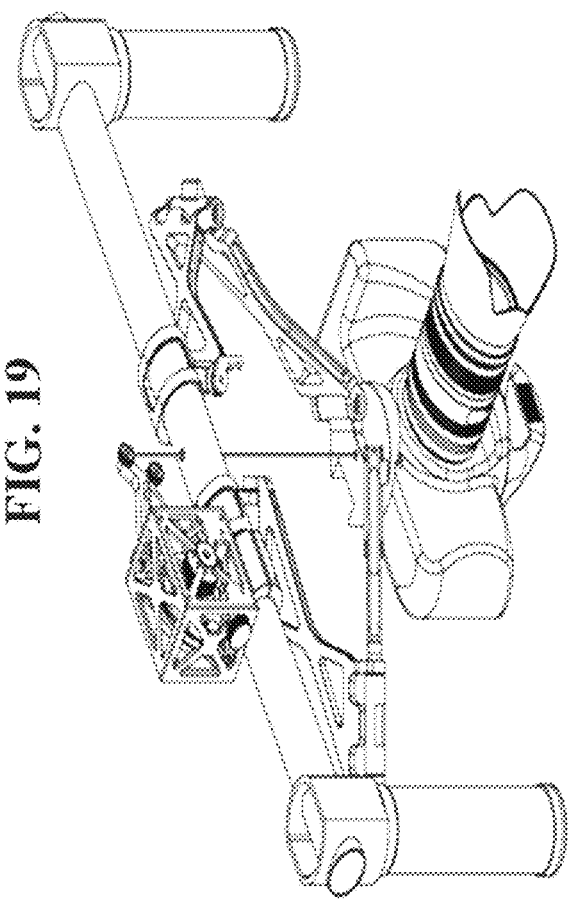
FIG. 20 shows a perspective view of the stabilizing device as illustrated in FIGS. 15-18 carrying a payload in accordance with an embodiment of the disclosure.

FIG. 15 shows a perspective view of a stabilizing device in accordance with an embodiment of the disclosure. The stabilizing device in FIG. 15 may be similar to those illustrated in FIGS. 2-4, except the constant force assembly in FIG. 15 is placed at a different side of the top handle bar compared to those shown in FIGS. 2-4. Further, in order to more clearly illustrate the stabilizing device of the disclosure, the payload has been omitted from FIG. 15. For further clarity, FIGS. 16-18 show a front view, a lateral view and a top view of the stabilizing device as illustrated in FIG. 15, respectively. Further, FIGS. 19 and 20 show different views of the stabilizing device after a payload, such as a camera depicted herein, is supported by the payload stabilization assembly.

Figure 21:
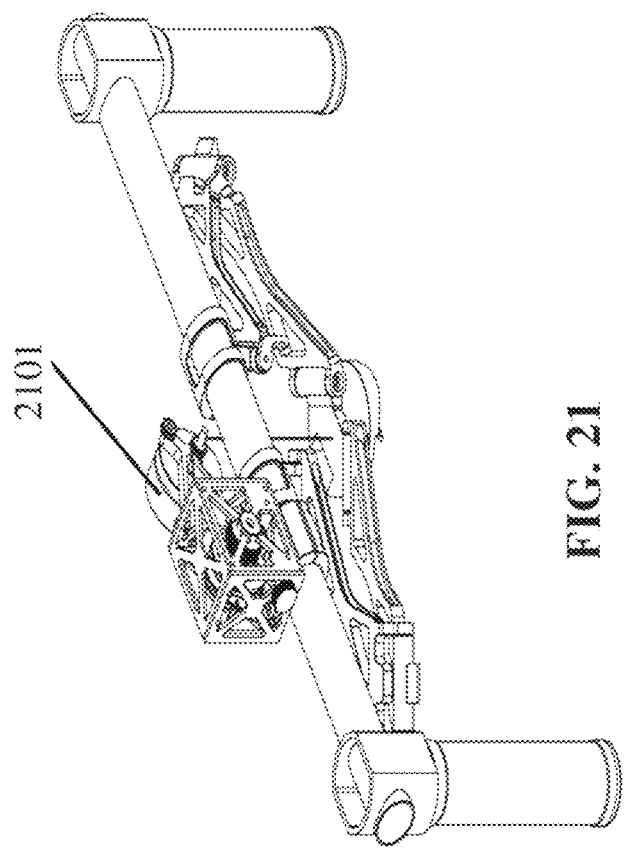
FIG. 21 shows a perspective view of a stabilizing device including a motor in accordance with an embodiment of the disclosure.
Figure 22:
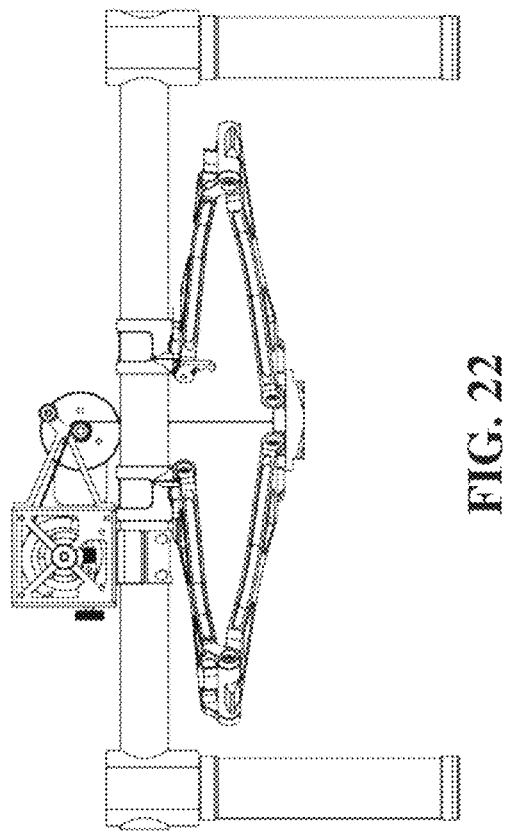
FIG. 22 shows a front view of the stabilizing device as illustrated in FIG. 21.

FIG. 21 shows a perspective view of a stabilizing device including a motor in accordance with an embodiment of the disclosure. The stabilizing device illustrated in FIG. 21 may be similar to the stabilizing device shown in FIGS. 15-18 expect in FIG. 21, a driving unit, such as a motor, may be mounted on the top handle bar. The output shaft of the motor may drive the drawing member, such as the bracing wire or steel cable to move at a suitable speed and may return to an expected location. For example, by setting the rotational speed of the motor, the rotation of the output shaft of the motor may assist the constant force assembly in supporting the payload and the payload stabilization assembly by increasing the lifting power and enable the payload to stop at an appropriate location, for example, above a first threshold height in order to maintain the elasticity of the stabilizing device, and below a second threshold height to prevent the payload from crashing into the top handle bar. The front view of the stabilizing device including the motor is shown in FIG. 22 for illustrative purposes.

A motor as described herein may be an AC motor or a DC motor. Any description herein of a motor may apply to any type of motor or other actuator. Motors may be direct drive motors. Other examples of types of motors may include, but are not limited to brushed or brushless motors, servomotors, switched reluctance motors, stepper motors, or any other types of motors. The motor may be powered by an energy source, such as a battery system, on the stabilizing platform. Alternatively the motor may be powered by a power cord connected to an external power source.

Figure 23:
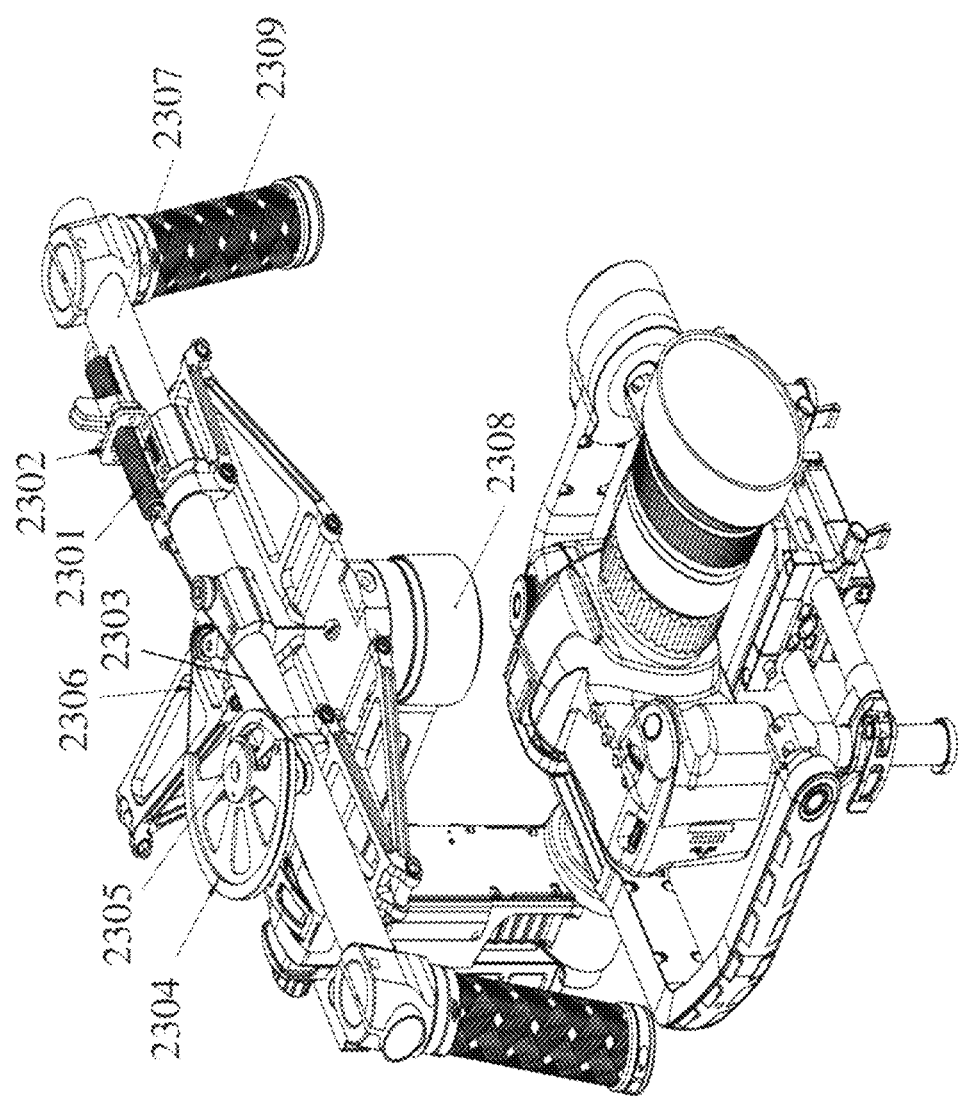
FIG. 23 shows a perspective view of a stabilizing device in accordance with an embodiment of the disclosure.
Figure 25:
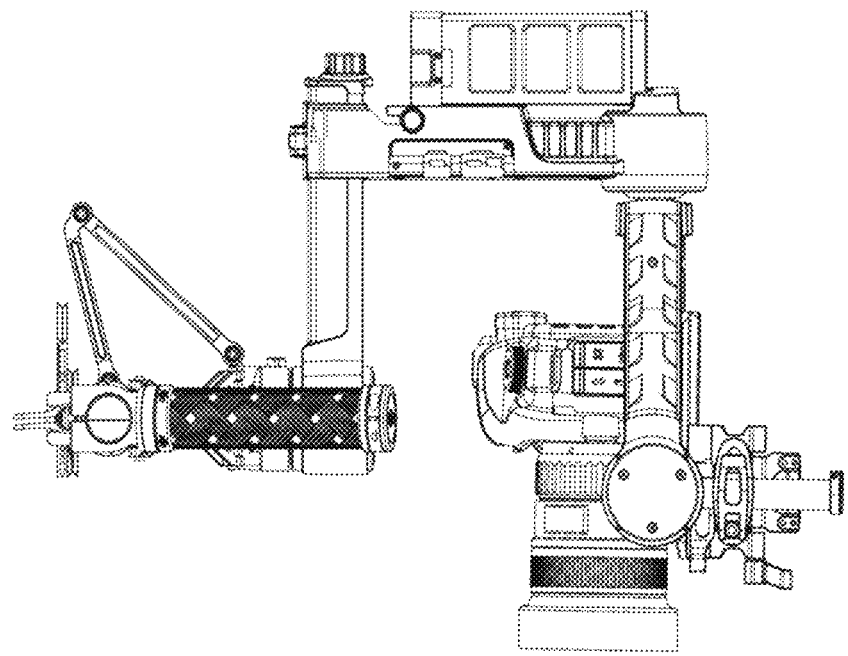
FIG. 25 shows a lateral view of the stabilizing device as illustrated in FIG. 23.
Figure 24:
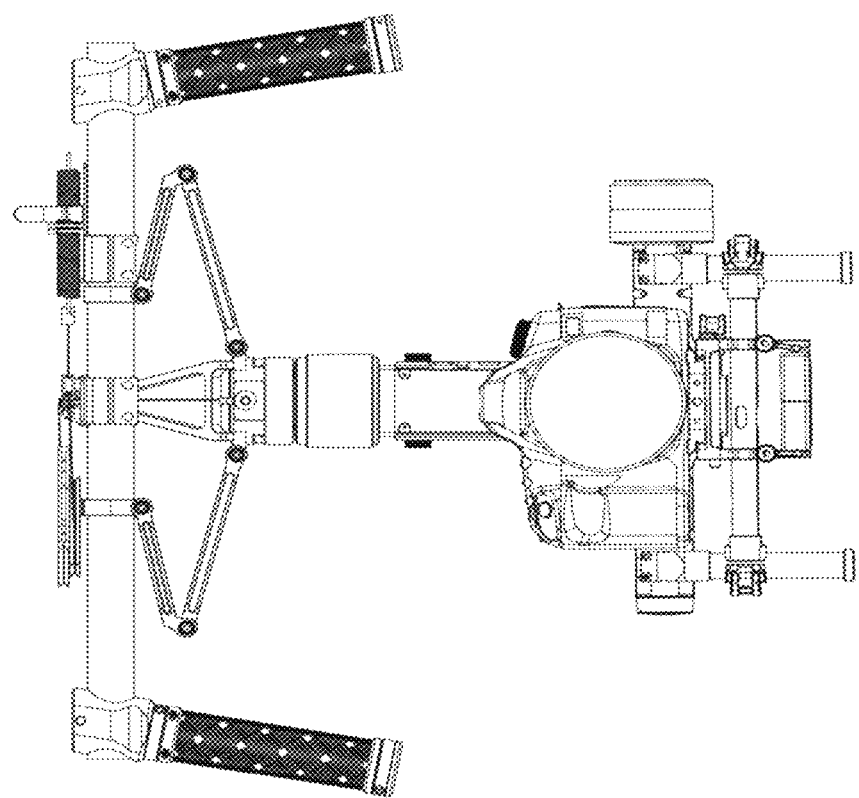
FIG. 24 shows a front view of the stabilizing device as illustrated in FIG. 23.

FIG. 23 shows a perspective view of a stabilizing device in accordance with an embodiment of the disclosure. It can be seen that the stabilizing device depicted in FIG. 23 may be different from the stabilizing device shown in FIG. 2 due to a different constant force assembly. The constant force assembly may include a tension spring 2301, a spring adjusting device 2302, a first drawing member 2303, a rotatable wire spool 2304, a cam 2305, a second drawing member 2306, a top handle bar 2307, and grips 2309. The stabilizing device may support a payload 2308, which is shown as a gimbal supporting a camera. The output end of the tension spring may be connected to the cam via a first drawing member, such as the bracing wire or steel cable. The cam may be connected with the rotatable wire spool by a bearing connection, such that either one may cause the other to rotate when unstable movements occur in the vertical direction. In some embodiments, based on the resilient force generated by the tension spring, the cam or the rotatable wire spool may drive each other to rotate clockwise or counter-clockwise depending on the translation direction of the payload in the vertical direction, i.e., moving upwards or moving downwards. For example, when the user accidentally moves the handle assembly upward, due to the inertial property of a payload, the rotatable wire spool may rotate in a clockwise direction, which may drive the cam to rotate in clockwise direction as well. The tension spring would then be stretched, thereby storing the energy. Likewise, when the user accidentally moves the handle assembly downward, due to the inertial property of a payload, the rotatable wire spool may rotate in a counterclockwise direction, which may drive the cam to rotate in the counterclockwise direction as well. The tension spring would then be retracted, thereby releasing the energy. In this way, the lifting power as transferred on the second drawing member may equipoise the gravity force of the payload together with the payload stabilization assembly, such as the two pairs of link bars illustrated, such that a net force of the payload stabilization assembly with the payload in the vertical direction is substantially zero. The front and lateral views of the stabilizing device illustrated in FIG. 23 are respectively shown in FIGS. 24 and 25.

FIG. 26 shows a perspective view of a constant force assembly in accordance with an embodiment of the disclosure. The constant force assembly illustrated in FIG. 26 may be similar to the constant force assembly shown in FIGS. 23-25 except for the spring adjusting device is omitted in FIGS. 23-25. A fixed end of the tension spring is secured by a pipe clamp via a sleeve bearing and a free end of the tension spring is tied to one end of a first drawing member 2303. Another end of the first drawing member is tied to the cam 2306 at a location indicated by 2602 which is beneath a rotatable wire spool and rotatably connected thereto by a bearing connection or a location pin. When the payload is carried directly or indirectly by a second drawing member 2305 which runs over the rotatable wire spool starting at a location indicated by 2601, the rotation of the rotatable wire spool, due to vertical unstable movements, may cause the cam beneath the rotatable wire spool to rotate in the same direction, thereby causing the tension spring to stretch or retract. Therefore, the second drawing member may drive the payload to move up and down such that a net force of the payload with the payload stabilization assembly may be substantially zero. The lateral view of the constant force assembly as described above is provided in FIG. 27.

Figure 28:
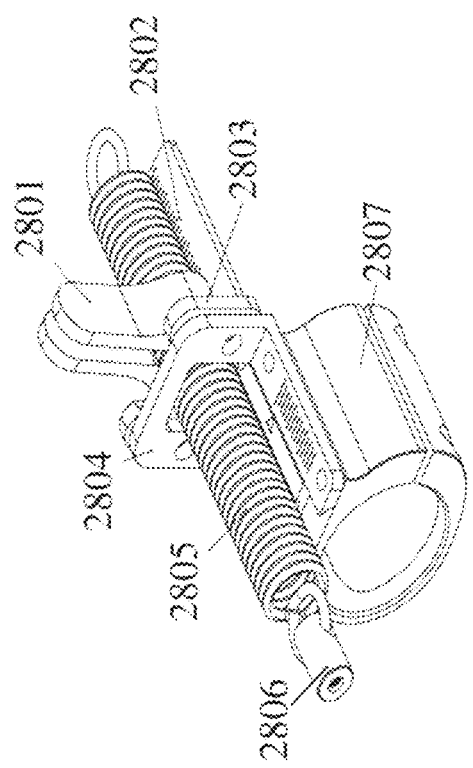
FIG. 28 shows a perspective view of a tension spring assembly according to an embodiment of the disclosure.
Figure 29:
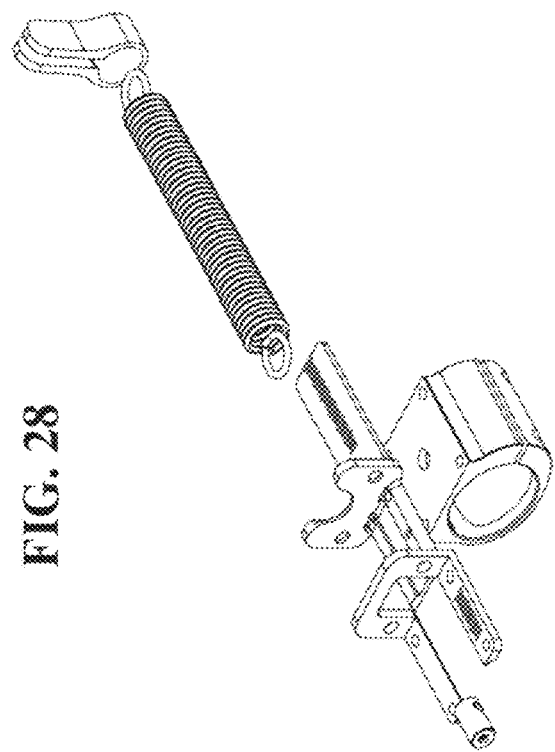
FIG. 29 shows an exploded view of the tension spring assembly as illustrated in FIG. 28.
Figure 32:
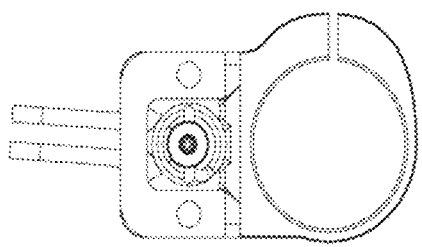
FIG. 32 shows a lateral view of the tension spring assembly as illustrated in FIG. 28.
Figure 30:
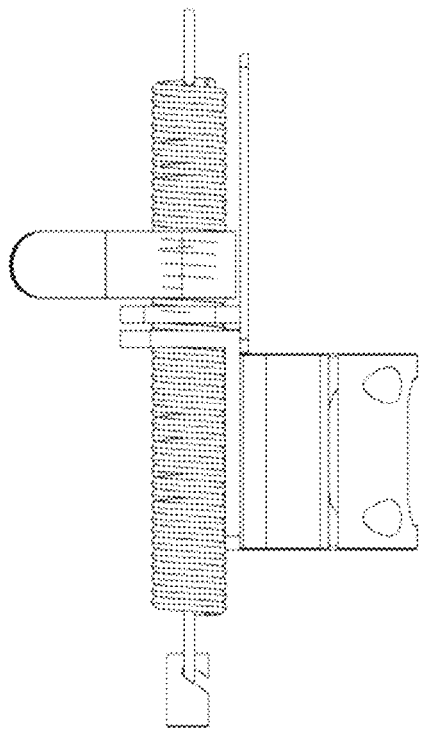
FIG. 30 shows a front view of the tension spring assembly as illustrated in FIG. 28.
Figure 31:
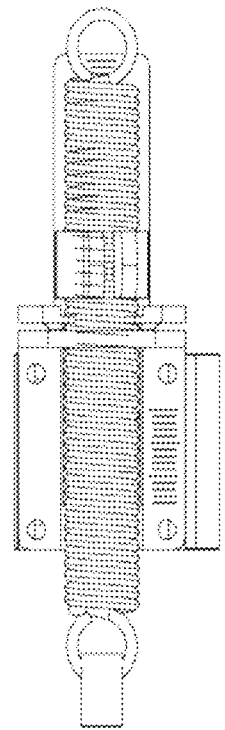
FIG. 31 shows a top view of the tension spring assembly as illustrated in FIG. 28.

FIG. 28 shows a perspective view of a tension spring assembly according to an embodiment of the disclosure. The tension spring assembly depicted in FIG. 28 may be similar to the tension spring assembly shown in FIG. 23 and includes more details about the components therein. As illustrated in FIG. 28, the tension spring assembly may include a spring rate adjusting clamp 2801, a spring rate scale plate 2802, a spring rate adjusting plate 2803, a pre-tightening adjusting plate 2804, a tension spring 2805, a bearing sleeve 2806 and a pipe clamp 2807. Depending on the magnitude of the gravitational force on the payload with the payload stabilization assembly, a user may adjust the spring rate of the tension spring before mounting it on the top handle bar. For example, by using the spring rate adjusting clamp to clamp the tension spring and putting the spring rate adjusting plate at an appropriate location according to the scales as indicated by the spring rate scale related to the weight, the user may divide the tension spring into two sections and obtain an appropriate spring rate. A first section, such as from the bearing sleeve to the pre-tightening adjusting plate, would be used in the force equipoising operations. Conversely, a second section, such as from the spring rate adjusting plate to the fixed end of the tension spring, need not be used in the force equipoising operations. The pre-tightening adjusting plate may fasten the tension spring on the pipe clamp, which may then be mounted on the top handle bar. Based on the pre-tightening operation of the pre-tightening adjusting plate, the tension spring may have a preload force which may be used to counteract the gravitational force on the payload with the payload stabilization assembly. The exploded view, the front view, the top view, and the lateral view of the tension spring assembly as described above are respectively shown in FIGS. 29, 30, 31, and 32 for illustrative purposes.

It is to be understood that the constant force assemblies described herein (such as a cam and a spring) are merely exemplary and other suitable mechanical structures may also be used. For example, instead of using a tension spring or volute spring, a constant force spring may be used for providing the constant force, such as those shown in FIGS. 33-41.

FIG. 33 shows a perspective view of a stabilizing device in accordance with an embodiment of the disclosure. The stabilizing device in FIG. 33 may include a handle 3301, a support bar 3302, a low link bar 3303, a setscrew 3304, a first bearing 3305, an upper link bar 3306, a second bearing 3307, a bearing base 3308, a rotating shaft 3309 of a constant force spring, a constant force spring 3310, an upper support plate 3311, a stop block 3312, and a lower support plate 3313. The setscrew may be used to connect the upper link bar with the lower link bar. The second bearing supported by the bearing base may be used to support the rotating shaft of the constant force spring. For further clarity, another perspective view of the stabilizing device herein is provided in FIG. 34 and a top view, a front view and a lateral view of the stabilizing device herein are respectively provided in FIGS. 35-37.

It can be understood from the depiction herein that a constant force assembly may comprise the constant force spring exerting a substantially constant force over its entire range of extension to equipoise the gravity force of a payload stabilization assembly with a payload. The constant force spring may comprise a rolled metal strip and a spool, and an outer end of the rolled metal strip is connected to the payload stabilization assembly. The structure of the constant force spring may be designed to provide an approximate constant force. As the constant force spring elongates within its operating range, the pulling force may increase but the variations of the pulling force are relatively small, thereby balancing the gravitational force on the payload with the payload stabilization assembly. During this process, an elastic force of the constant force spring may be customized or a mass block may be introduced to fine adjust the balanced gravitational force such that an equilibrium point would be at the middle of the stroke length.

The payload stabilization assembly may further comprise the support bar, a linkage mechanism similar to those discussed with reference to FIGS. 9 and 10, the upper support plate for supporting the constant force assembly which includes the constant force spring, and the lower support plate for supporting a payload, wherein one end of the support bar is attached to the handle assembly and another end of the support bar is attached to the linkage mechanism for securing the payload in the vertical direction such that the payload moves steadily in the vertical direction.

The linkage mechanism herein may comprise two pairs of link bars at an angle to each other (for example, about 90 degrees), and disposed symmetrically about the support bar, for example, about the longitudinal section of the support bar. The upper link bar and the lower link bar may be connected with one other by a bearing connection. In some embodiments, one end of the lower link bar and the corresponding one end of the upper link bar may be pivotally connected with one another at an angle. Another end of the upper link bar may be attached to the upper support plate and another end of the lower link bar may be attached to the lower support plate. This arrangement of the linkage mechanism may ensure that the payload, which may be supported by the lower support plate, may only move in the vertical direction instead of moving around in other directions.

The payload may comprise a gimbal connector 3314, a gimbal 3315 and a camera 3316. The gimbal connector may be used for detachably connecting the gimbal to the lower support plate and the camera may be carried or supported by the gimbal.

In some embodiments, the handle assembly and the payload may be electrically connected with one another through electrical wiring passing through the constant force assembly. A user can use the handle assembly to control the movement of the payload. This would be advantageous when the payload is a gimbal carrying a camera, just as shown in FIG. 33. For example, a number of control buttons may be provided on the handle assembly as a control panel. A user, by pressing one or more control buttons, may control the rotation of the camera in different axes, such as a pitch axis, a yaw axis and a roll axis, while capturing the videography or cinematography. Due to the stabilizing effect, the camera would become more stable in a fourth axis (i.e., a vertical axis) in addition to the previous three axes, i.e., a pitch axis, a yaw axis and a roll axis.

To detect or control the movement or rotation of the payload, in some embodiments, the stabilizing device may comprise a set of sensors that may detect rotations of the payload. The stabilizing device may have sensors on the support bars, link bars, handle assemblies, and/or motors, that may detect the rotation of the payload about at least one rotation of axis, such as one or more of the yaw, roll, and pitch axes. For example the sensors may be inertial sensors (e.g., positional or angular displacement sensors, velocity sensors, accelerometers, gyroscopes, and magnetometers), capacitive sensors, Hall sensors, or any other types of sensors as described elsewhere herein.

In some instances, the sensors may be capable of detecting linear and/or angular displacement, linear velocity and/or angular velocity, or linear or angular acceleration. The sensors may or may not be provided on any portion of the handle assembly, such as a grip, handle bar, bar, or any other portion. The sensors may or may not be provided on one, two, three or more of the motors. The sensors may or may not be provided on the payload. A processor onboard or off-board the stabilizing device may interpret the sensor data to detect a rotation about a rotation of axis, such as a yaw, roll, or pitch axis. Sensor data from any component of the stabilizing device may be used to detect positional information and/or rotation of the component. Sensor data from multiple components may be gathered and/or compared. In some instances, the sensor data from the components may be used to determine motion of the payload relative to the handle assembly or vice versa, motion of the payload relative to a fixed reference frame, motion of the handle assembly relative to the fixed reference frame, motion of any of the frame components relative to the fixed reference frame or any variation or combination thereof.

When a processor detects a rotation of the handle assembly indicating a change from a first mode/configuration to a second mode/configuration, the processor may change the motor control orientation. For example in a first mode a first motor may control the yaw axis rotation and a second motor may control the roll axis rotation. When the processor detects a change from a first mode to a second mode, the processor may switch the motor control such that a first motor may control the roll axis rotation and a second motor may control the yaw axis rotation. In a first and second mode, the pitch axis motor control may not change such that a third motor may control the pitch axis rotation in both the first mode and second mode.

Figure 38:
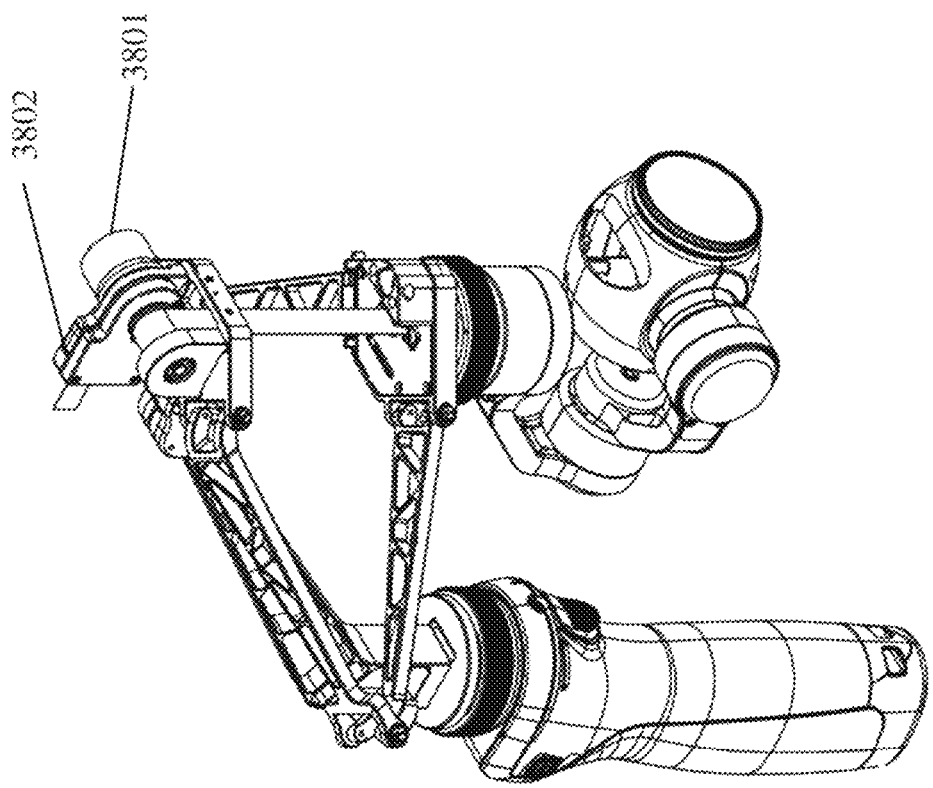
FIG. 38 shows a perspective view of a stabilizing device including a motor in accordance with an embodiment of the disclosure.
Figure 41:
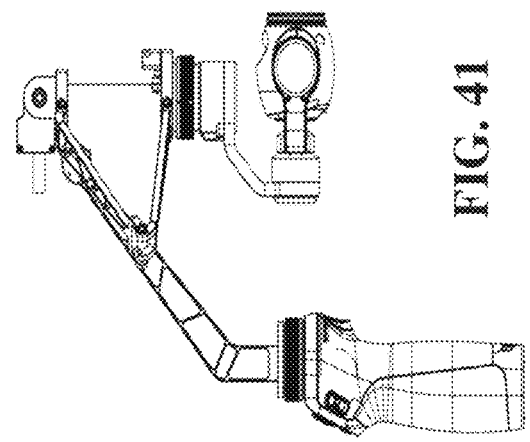
FIG. 41 shows a lateral view of the stabilizing device as illustrated in FIG. 38.
Figure 39:
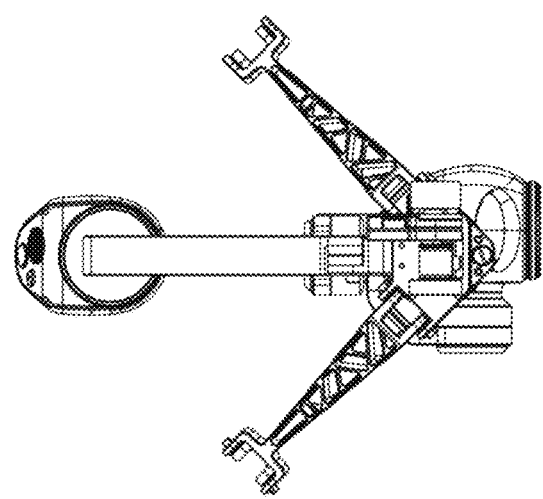
FIG. 39 shows a top view of the stabilizing device as illustrated in FIG. 38.
Figure 40:
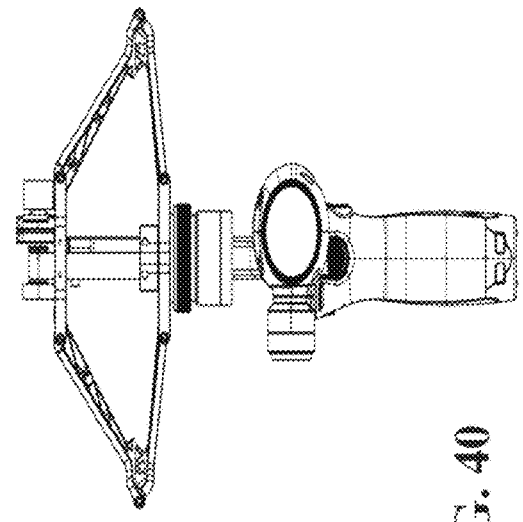
FIG. 40 shows a front view of the stabilizing device as illustrated in FIG. 38.

FIG. 38 shows a perspective view of a stabilizing device including a motor in accordance with an embodiment of the disclosure. The stabilizing device in FIG. 38 may be similar to the one shown in FIGS. 33-37 except that a motor 3081 is disposed on the upper support plate for driving the constant force spring. In some embodiments, to accurately control the rotating speed of the motor, a speed control unit 3802 may also be arranged on the stabilizing device, such as on the upper support plate. In some embodiments, based on instructions from one or more on-board or off-board processors, the speed control unit may control the rotation of the motor, for example, by increasing or decreasing the rotating speed. The rotation of the motor may drive the whole payload to return to an expected position, for example a middle part of the stroke length of the constant force spring, thereby controlling the movement of the payload in the vertical direction and improving the stabilization effect. For further clarity, a top view, a front view, and a lateral view of the stabilizing device are respectively provided in FIGS. 39-41.

A motor as described herein can be an AC motor or DC motor. Any description herein of a motor may apply to any type of motor or other actuator. Motors may be direct drive motors. Other examples of types of motors may include, but are not limited to brushed or brushless motors, servomotors, switched reluctance motors, stepper motors, or any other types of motors. The motor may be powered by an energy source, such as a battery system, on the stabilizing platform. Alternatively the motor may be powered by a power cord connected to an external power source.

In addition to the motor that permits the payload to move in a stable manner in the vertical direction (as described above), each rotation axis of the payload may also be controlled by a motor. For instance, a first motor may effect rotation about a yaw axis, a second motor may effect rotation about a roll axis, and a third motor may effect rotation about a pitch axis. The rotation axes of the motors may change depending on various configurations and modes of operation. For example, in the modes where the stabilizing devices according to embodiments of the disclosure are held by a user using both hands, such as those shown in FIGS. 2-4 and 23-25, a first motor may control the yaw axis rotation, a second motor may control the roll axis rotation, and a third motor may control the pitch axis rotation. Alternatively, in a mode where the stabilizing device is held by a user using only one hand, such as those shown in FIGS. 33-41, a first motor may control the roll axis rotation, a second motor may control the yaw axis rotation, and a third motor may control the pitch axis rotation.

Figure 42:
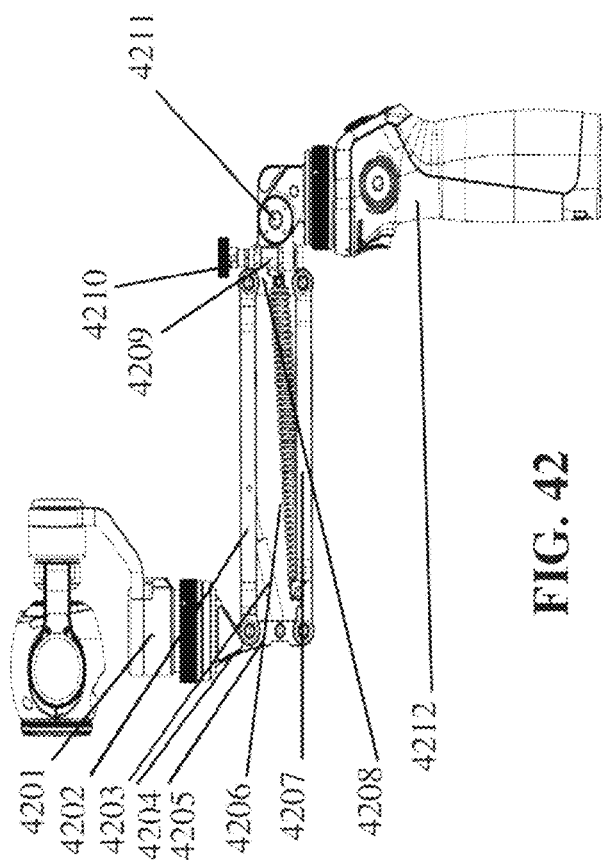
FIG. 42 shows a lateral view of a stabilizing device including a parallelogram linkage in an orientation in accordance with an embodiment of the disclosure.

FIG. 42 shows a lateral view of a stabilizing device including a parallelogram linkage in an orientation in accordance with an embodiment of the disclosure. It can be seen that the stabilizing device illustrated in FIG. 42 may carry or support a gimbal 4201 with a camera placed thereon. As illustrated, the stabilizing device may include a first long link bar 4202, a damper 4203, a gimbal support 4204, a first short link bar 4205, a spring 4206, a second long link bar 4207, a second short link bar 4208, an adjusting nut 4209, an adjustment knob 4210, and a rotating hinge 4211, and a handle assembly 4212.

The first short link bar may be connected with the gimbal system via the gimbal support, and the second short link bar may be connected with the handle assembly. The spring may be obliquely connected between the short link bar and the long link bar. A stress analysis of this structure reveals that a vertical and lifting force may be generated at the end of the long link bar (i.e., at the first short link bar) by adjusting parameters and connecting locations of the spring, and this force may be adjusted as a constant-force approximately equal to a weight to be balanced or equipoised. Therefore, the stabilizing device may be equivalent to a spring-based dampening system with a weak spring rate, for diminishing the jitter in the vertical direction caused by e.g., human walking, climbing, jumping, or the like. The damper may be used to absorb the energy of the whole system and avoid resonance. In some instances where the system has weak stiffness and requires small damping, it would be hard to cause resonance and therefore the damper may be removed or the damping may be provided by increasing the friction at the hinged joint of the linkage instead of using a separate damper. In some embodiments, the handle and payload (such as the gimbal system herein) may be dampened as a whole to achieve a better stability.

As illustrated, the two long link bars and two short link bars may constitute a parallelogram linkage with 1) a resilient member (such as a spring) positioned proximately along a diagonal of the parallelogram linkage and 2) four pivots, each of which may be positioned at a different one of four corners of the parallelogram linkage, i.e., at a joint of the long link bar and the short link bar. The parallelogram linkage may serve as a constant force assembly according to embodiments of the disclosure. In some embodiments, the spring may be a tension spring having a first end and a second end, and the first end may be attached to the second long link bar at a first attachment point and the second end may be attached to a connector between two pivots that are adjacent to the handle assembly at a second attachment point. The connector may be the adjusting nut as depicted. The adjusting nut may be movably connected with the adjustment knob and the adjustment of the adjustment knob may cause the adjusting nut to move up and down in the vertical direction, thereby changing height of the second attachment point in the vertical direction relative to the pivot. An approximately constant force opposite to the gravitational force on the payload may be generated using the oblique pulling of the spring.

The force provided by the parallelogram linkage may be determined according to one or more parameters of the tension spring, structural parameters of the parallelogram linkage and positions of the first and second attachment points. In some embodiments, the one or more parameters of the tension spring may comprise at least one of a mean coil diameter, a wire diameter, and the number of coils. In some embodiments, the parallelogram linkage may be configured to have a natural frequency which may be low enough to reduce or eliminate low-frequency jitter in the vertical direction.

Figure 43:
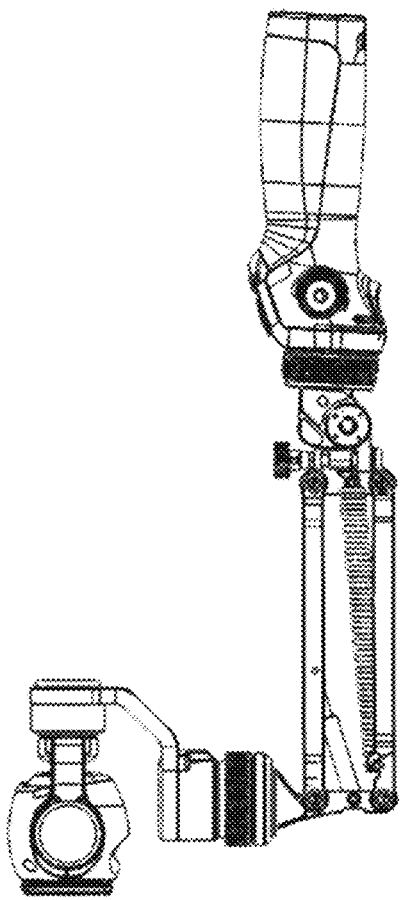
FIG. 43 shows another lateral view of a stabilizing device including a parallelogram linkage in another orientation in accordance with an embodiment of the disclosure.

The handle assembly may comprise a single grip which may be hinged to the constant force assembly such that the single grip has a variable orientation relative to the constant force assembly. For example, by partially rotating the grip, it may be oriented perpendicularly to the parallelogram linkage, such as shown in FIG. 42, or collinear to the parallelogram linkage, such as shown in FIG. 43. The orientation may be selected according to the user's preference.

In some embodiments, the handle assembly may be used as a handle for the payload after the handle assembly is disconnected from the constant force assembly and directly attached to the payload. For example, after removing the parallelogram linkage and the gimbal support, the gimbal may be directly connected to the grip and therefore the user may hold the grip to perform shooting without taking into account the jitter in the vertical direction. This would be convenient for shooting in an environment where such jitter less occurs, for example, moving indoors or crossing flat lands.

Figure 44:
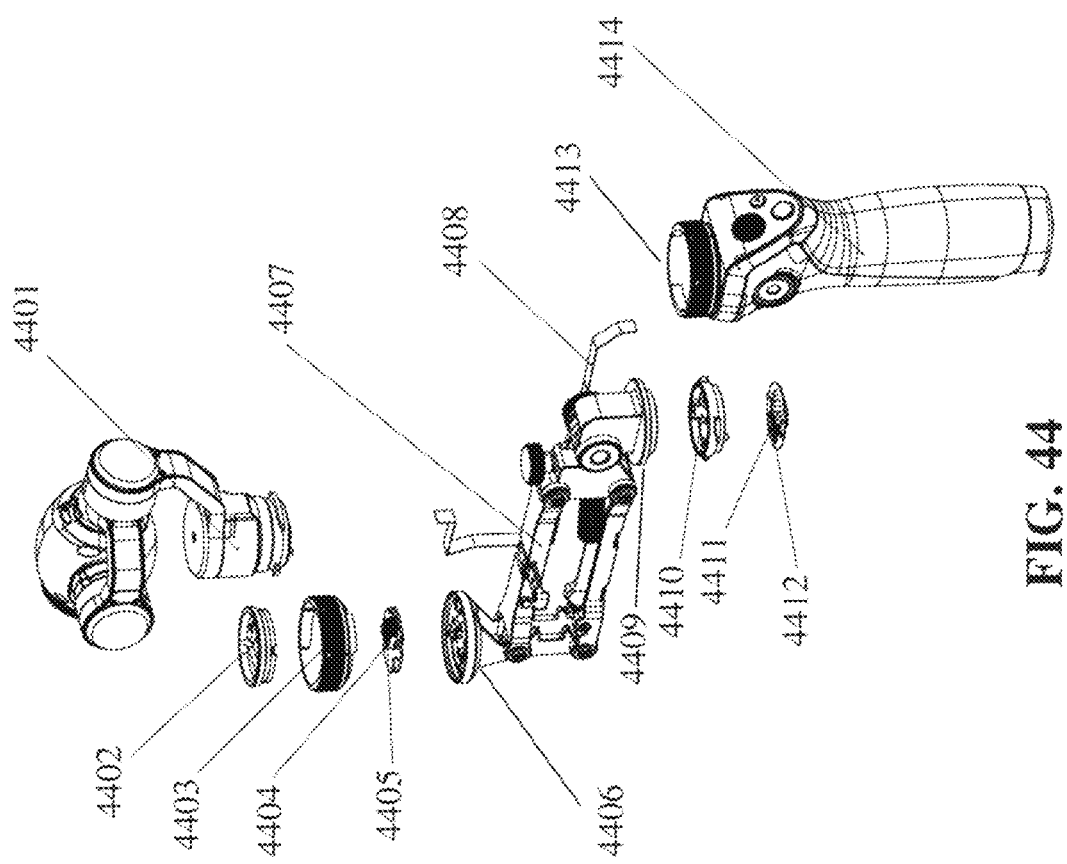
FIG. 44 is an exploded view of a stabilizing device in accordance with an embodiment of the disclosure.

FIG. 44 is an exploded view of a stabilizing device carrying a payload in accordance with an embodiment of the disclosure.

As illustrated in FIG. 44, a gimbal system 4401 including a camera and multiple motors, a fast release inner ring 4402, a first fast release external ring 4403, a gimbal connecting circuit board 4404 for providing power supply or transmitting various control signals and a first connector 4405, which may be connected sequentially on a gimbal support by snap joints or threaded fasteners with possible one or more inside locking blocks or stop blocks. To support the electrical connection between the handle assembly 4414 and gimbal system, flexible printed circuit (FPC) wiring 4408 may be arranged at the bottom of the parallelogram linkage 4407 for signal transmission between the handle assembly and the gimbal system. A linkage support 4409 of the parallelogram linkage may be connected with a handle connector 4410, a handle connecting circuit board 4411, a second connector 4412, and a second fast release external ring 4413 by snap joints, or threaded fasteners with possible one or more inside locking blocks or stop blocks. Upon completing the assembly of all the components, a user may hold, via the handle assembly, the stabilizing device with the parallelogram linkage to conduct shooting, for example, videography in a stable manner.

Figure 45:
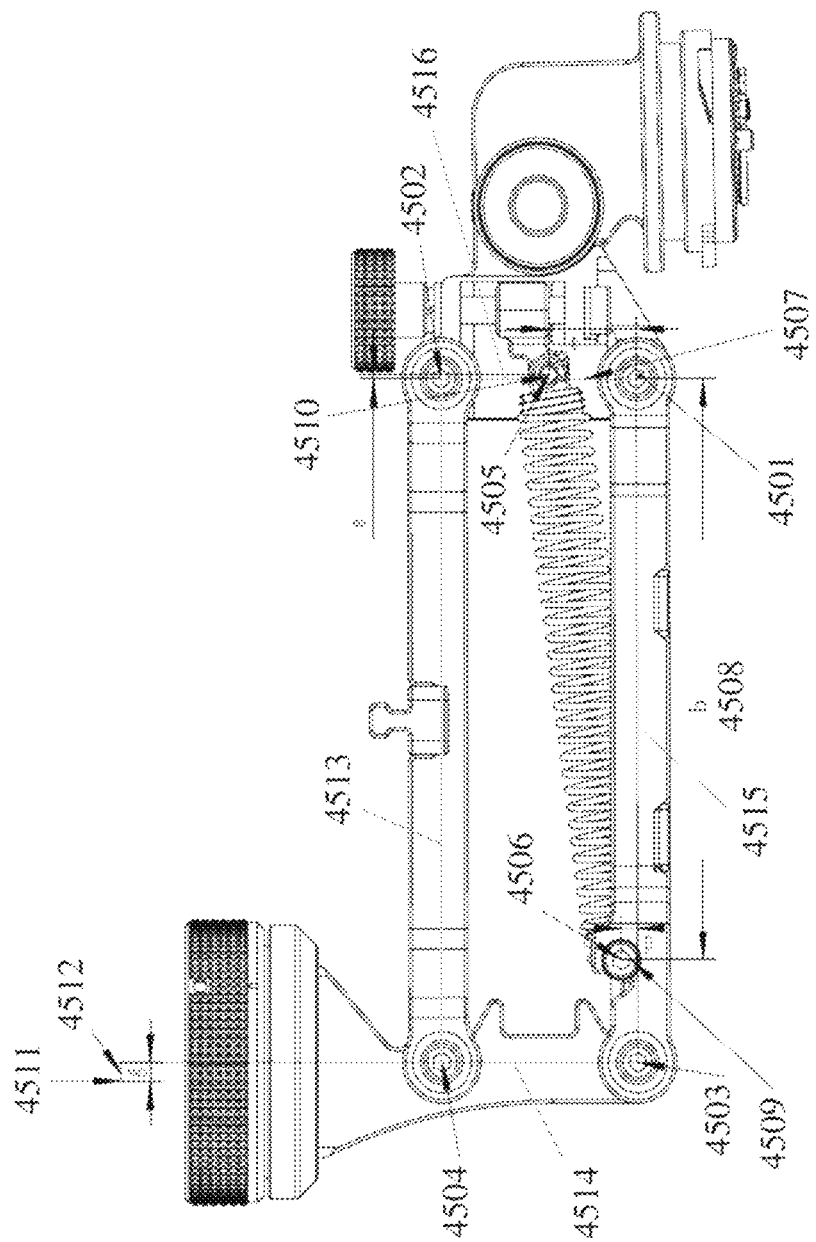
FIG. 45 is a schematic showing principles of a parallelogram linkage in accordance with an embodiment of the disclosure.

FIG. 45 is a schematic showing a parallelogram linkage in accordance with an embodiment of the disclosure. It can be seen the parallelogram linkage in FIG. 45 may be similar to the parallelogram linkage shown in FIGS. 42-44.

As previously described, the parallelogram linkage may comprise four pivots and a resilient member obliquely arranged within the parallelogram linkage. The four pivots may include a first pivot 4501, a second pivot 4502, a third pivot 4503, and a fourth pivot 4504. The attachment points of the resilient member (e.g., a spring as shown) may comprise a first attachment point 4505 and a second attachment point 4506.

The first pivot and the second pivot are configured to be proximal to the handle assembly and vertically aligned with each other at an initial state. The third pivot and the fourth pivot are configured to be proximal to the payload stabilization assembly and vertically aligned with each other at the initial state. The second pivot may be higher than the first pivot in the vertical direction, and the fourth pivot may be higher than the third pivot in the vertical direction. In some embodiments, the resilient member is a tension spring having a first end and a second end, and the first end is attached to a connecting rod (for example, the second long link bar 4207 in FIG. 42) connecting the first pivot and third pivot at a first attachment point proximal to the third pivot, and the second end is attached to a connector (for example, the adjusting nut 4209 in FIG. 42) between the second pivot and first pivot in the vertical direction at a second attachment point. In some embodiments, the connector may be moveably connected with an adjustment knob and the adjustment of the adjustment knob may cause the connector to move up and down in the vertical direction, thereby changing the height of the second attachment point in the vertical direction relative to the first pivot.

As further illustrated in FIG. 45, "a" indicated at 4507 may represent a height of the first attachment point from the first pivot. "b" indicated at 4508 may represent a distance between the second attachment point and the first pivot. "d" indicated at 4509 may represent a distance between the second attachment point and a horizontal line passing through the first and third pivots, that is, a distance in a vertical direction from the second attachment point to a horizontal plane passing through the longitudinal axes of the first and third pivots. "e" indicated at 4510 may represent a distance that the first attachment point displaces from a plumb line passing through the first and second pivots, that is, a distance in a horizontal direction from the first attachment point to a vertical plane passing through the longitudinal axes of the first and second pivots. A gravity center of the payload may be represented at 4511 and "g" at 4512 may represent a distance that the gravity center of the payload may displace from the plumb line passing through the third and fourth pivots, that is, a distance in the horizontal direction from the gravity center of the payload to a vertical plane passing through the longitudinal axes of the third and fourth pivots.

Factors affecting the lifting support of the parallelogram linkage may include spring parameters, structural parameters of the parallelogram linkage, and locations of the attachment points of the spring. A graph of the lifting power or support force versus elevation of the payload, or a graph of the lifting power versus inclined angles of the parallelogram linkage, may be obtained by changing some or all of the above parameters. The graph of the support force versus elevation of the payload is shown in FIG. 46, where the short link bars remain vertical and the long link bars remain horizontal, and elevation of the payload is almost zero.

Figure 46:
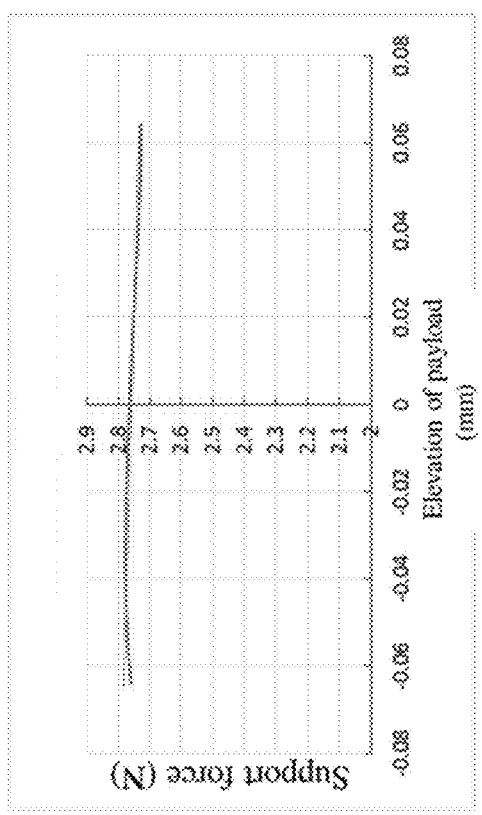
FIG. 46 is a graph showing relationships between support forces in a vertical direction and elevations of a payload using a parallelogram linkage in accordance with an embodiment of the disclosure.

In order to eliminate the jitter with a low frequency in the vertical direction, the inherent frequency of the parallelogram linkage should be low and therefore the optimal shape of the curve should be approximately horizontal with the left part higher than the right part, as shown in FIG. 46. The higher the slope of the curve, the higher the inherent frequency of the linkage.

Regarding the adjustments of the spring parameters, if the lifting power or support force is satisfied, the effect would be better if the spring is designed with a large to medium diameter, a small wire diameter, and fewer number of turns. Adjusting the height "a" of the attachment point of the spring from the first pivot may change the lifting support. In other words, a vertical distance between the second attachment point and the center of the first pivot may be variable such that the constant force assembly may provide different counteracting forces for gravitational forces on different payloads.

In some instances, the main parameters affecting the shape of the curve may be the distance "e," which is a distance in a horizontal direction from the first attachment point to a vertical plane passing through the longitudinal axes of the first and second pivots. When "e" is a positive value, the first attachment point would be within a rectangle enclosed by connecting lines (such as four connecting lines 4513-4516 shown in FIG. 45) connecting four pivots of the parallelogram linkage. When "e" is zero, the first attachment point would be on the connecting line connecting the first and second pivots. When "e" is a negative value, then the first attachment point is outside the rectangle at issue. When the first attachment point is adjacent to the rectangle and at the outside thereof, i.e., "e" is a less negative value, the stabilization effect would be better. In other words, according to the embodiments of the disclosure, one attachment point of the resilient member is displaced in a horizontal direction by a negative offset distance from a vertical plane passing through longitudinal exes of two of four pivots that are adjacent to the handle assembly. In some embodiments, the negative offset distance may be in a range of about −2 millimeter (mm) to 0 mm or −0.6 mm to −0.2 mm. In some embodiments, the negative offset distance may be −0.4 mm.

In some instances, the gravity center of the payload may be displaced from the connecting line connecting the third and fourth pivots (such as the connecting line 4514 shown in FIG. 45) by "g." When the gravity center of the payload is near or close to the connecting line at issue, the stabilization effect may be better. The optimal position of the payload occurs when the gravity center of the payload is on the connecting line.

Figure 47:
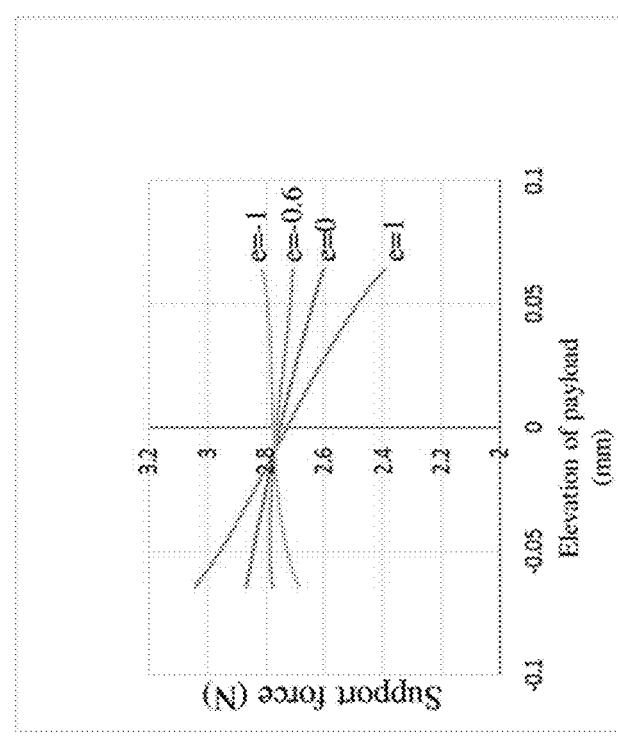
FIG. 47 is a graph showing the effect of locations of two attachment points of a resilient member of a parallelogram linkage on support forces and elevations of a payload in accordance with an embodiment of the disclosure.

FIG. 47 is a graph showing the effect of locations of two attachment points of a resilient member of a parallelogram linkage on support forces and elevations of a payload in accordance with an embodiment of the disclosure, where "g"=0, i.e., the distance that the gravity center of the payload may displace from the plumb line passing through the third and fourth pivots is zero. As previously described, the optimal shape of the curve should be approximately horizontal with the left part higher than the right part. According to this rule, it can be found that the curve with "e"=−6 may achieve the best stabilization effect among the four curves. Therefore, in some embodiments, the negative offset distance may be about −0.6 mm.

Figure 48:
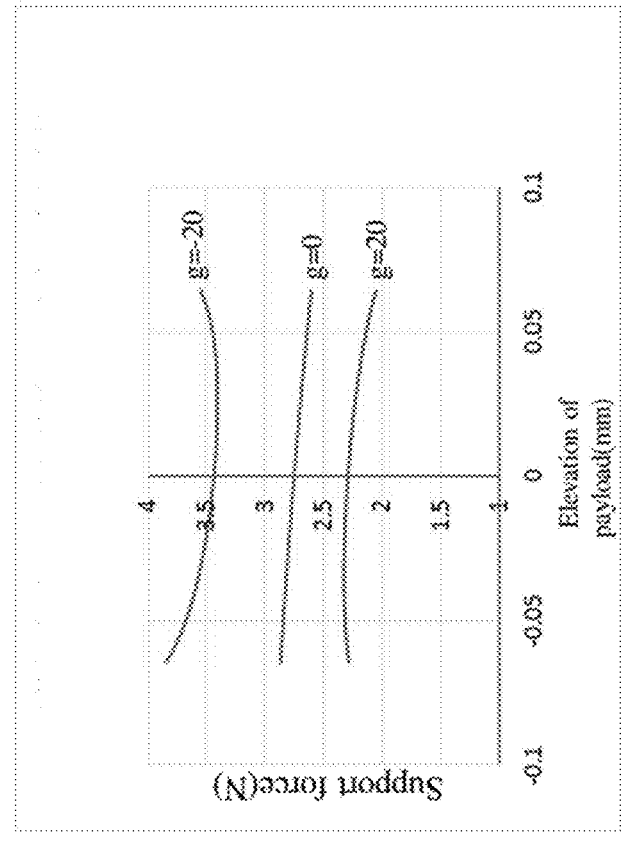
FIG. 48 is another graph showing the effect of locations of two attachment points of a resilient member of a parallelogram linkage on support forces and elevations of a payload in accordance with another embodiment of the disclosure.

FIG. 48 is another graph showing the effect of locations of two attachment points of a resilient member of a parallelogram linkage on support forces and elevations of a payload in accordance with another embodiment of the disclosure, where "e"=0, i.e., the distance that the first attachment point displaces from a plumb line passing through the first and second pivots is zero. As previously noted, the optimal shape of the curve should be approximately horizontal with the left part higher than the right part. According to this rule, it can be found that the curve with "g"=0 may achieve the best stabilization effect among the three curves. Therefore, in some embodiments, a gravity center of the payload may be within a vertical plane passing through longitudinal axes of two of four pivots that are adjacent to the payload stabilization assembly.

In addition to providing various embodiments of the stabilizing devices described with reference to FIGS. 1-48, the disclosure may also provide a number of methods for using or operating such stabilizing devices.

In some embodiments, a method for stabilizing a payload is provided. The method may comprise supporting the payload using a payload stabilization assembly configured to permit the payload to rotate about at least one axis of rotation. The method may also comprise providing a force that equipoises a gravity force of the payload stabilization assembly with the payload in a vertical direction such that a net force of the payload stabilization assembly with the payload in the vertical direction is substantially zero, using a constant force assembly (1) configured to support the payload stabilization assembly, and (2) operably connected to a handle assembly comprising one or more grips configured to permit a user to support the entirety of the stabilizing device using the one or more grips.

In some embodiments, a method for stabilizing a payload is provided. The method may comprise supporting the payload using a payload stabilization assembly configured to permit the payload to rotate about at least one axis of rotation. The method may also comprise permitting, via the payload stabilization assembly, the payload to rotate about at least one axis of rotation when directly operably connected to the handle assembly without a constant force assembly being operably connected to the handle assembly. The method may further comprise permitting, via the payload stabilization assembly, the payload to rotate about at least one axis of rotation when supported by the constant force assembly that is operably connected to the handle assembly, wherein the constant force assembly is configured to provide force that equipoises a gravity force of the payload stabilization assembly with the payload in a vertical direction such that a net force of the payload stabilization assembly with the payload in the vertical direction is substantially zero.

In some embodiments, a method of using a constant force assembly to stabilize a payload is provided. The method may comprise permitting the constant force assembly to be detachably connected to a handle assembly of a stabilizing device using a first interface of the constant force assembly, wherein the handle assembly comprises one or more grips. The method may also comprise permitting the constant force assembly to be detachably connected to a payload stabilization assembly of the stabilizing device using a second interface of the constant force assembly, wherein the payload stabilization assembly is configured to support the payload and permit the payload to rotate about at least one axis of rotation. The method may further comprise providing a force, using the constant force assembly, that equipoises a gravity force of the payload stabilization assembly with the payload in a vertical direction such that a net force of the payload stabilization assembly with the payload in the vertical direction is substantially zero.

In some embodiments, a method for stabilizing a payload is provided. The method may comprise supporting the payload using a payload stabilization assembly configured to permit the payload to rotate about at least one axis of rotation. The method may also comprise providing a force that equipoises a gravity force of the payload stabilization assembly with the payload in a vertical direction such that a net force of the payload stabilization assembly with the payload in the vertical direction is substantially zero, using a constant force assembly (1) configured to support the payload stabilization assembly, and (2) operably connected to a handle assembly comprising one or more grips, wherein the constant force assembly comprises a parallelogram linkage which includes four pivots and a resilient member obliquely arranged within the parallelogram linkage, and one attachment point of the resilient member is displaced in a horizontal direction by a negative offset distance from a vertical plane passing through longitudinal axes of two of four pivots that are adjacent to the handle assembly.

The methods as discussed above in accordance with the embodiments of the disclosure may also comprise other steps for implementing one or more stabilizing devices as discussed before and the pertinent descriptions regarding the operations of the stabilizing devices may also be applicable to the methods as discussed above.

Figure 49:
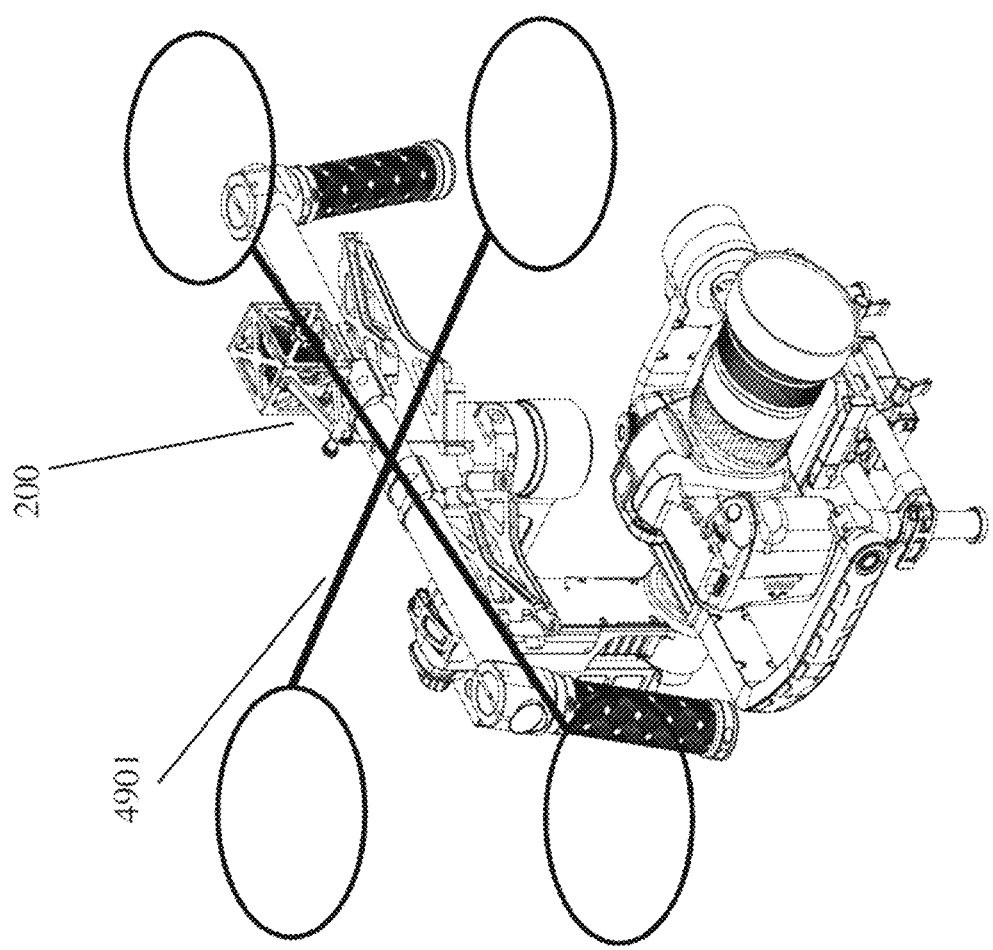
FIG. 49 shows an example of a stabilizing device mounted on objects in accordance with an embodiment of the disclosure.

FIG. 49 shows an example of a stabilizing device mounted on an object in accordance with an embodiment of the disclosure. The stabilizing device 200 in FIG. 49 may be similar to the stabilizing device shown in FIGS. 2-4 and mounted to the object 4901. Other stabilizing devices according to various embodiments of the present disclosure may also be capable of being mounted to the object as needed. The object may be a stationary object, or a movable object, such as a vehicle. When the stabilizing device according to the embodiments of the disclosure is mounted on a vehicle, it may or may not be held by a human user. Alternatively, the stabilizing device may be mounted to a vehicle or any other object using a permanent or temporary attachment. For example, a boom may be provided, from which the stabilizing device may hang. The stabilizing device may be mounted to a front, back, side, top, or bottom of a vehicle. A vehicle may have attachments for a stabilizing device in one or more locations on the vehicle. The vehicle may be a car, truck, bus, trolley, boat, motorcycle, bike, airplane, jet plane, unmanned aerial vehicle (UAV), a train, or any other type of vehicle as described elsewhere herein.

The embodiments of the disclosure described herein may include multiple stabilizing devices that can be carried by a wide variety of movable objects. Any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal.

In some embodiments, when the stabilizing device is about to be mounted on the UAV, the grips previously attached to the handle assembly may be detached therefrom. Therefore, it may reduce the size and volume of the stabilizing devices of the disclosure. Further, when mounted on the UAV, a remote controller may be shared by the UAV and the stabilizing device according to the embodiments of the disclosure. Thereby, the user may be able to remotely transmit the instructions to the stabilizing device for, for example, commencing the stabilization operations in the vertical direction or stopping the stabilization operations. In some embodiments, a separate remote controller may be used to independently control the operations of the stabilizing device. Further, the data collected by one or more sensors on the stabilizing device may be forwarded to one or more processors on board the UAV or off board the UAV. Once the processors complete the operations based on the collected data, they may directly transmit the results to the stabilizing device for making a decision related to shooting, when the payload includes a camera. For example, the UAV may instruct one or more motors to rotate such that the camera may be able to shoot images in different directions and with different angles of view.

Figure 50:
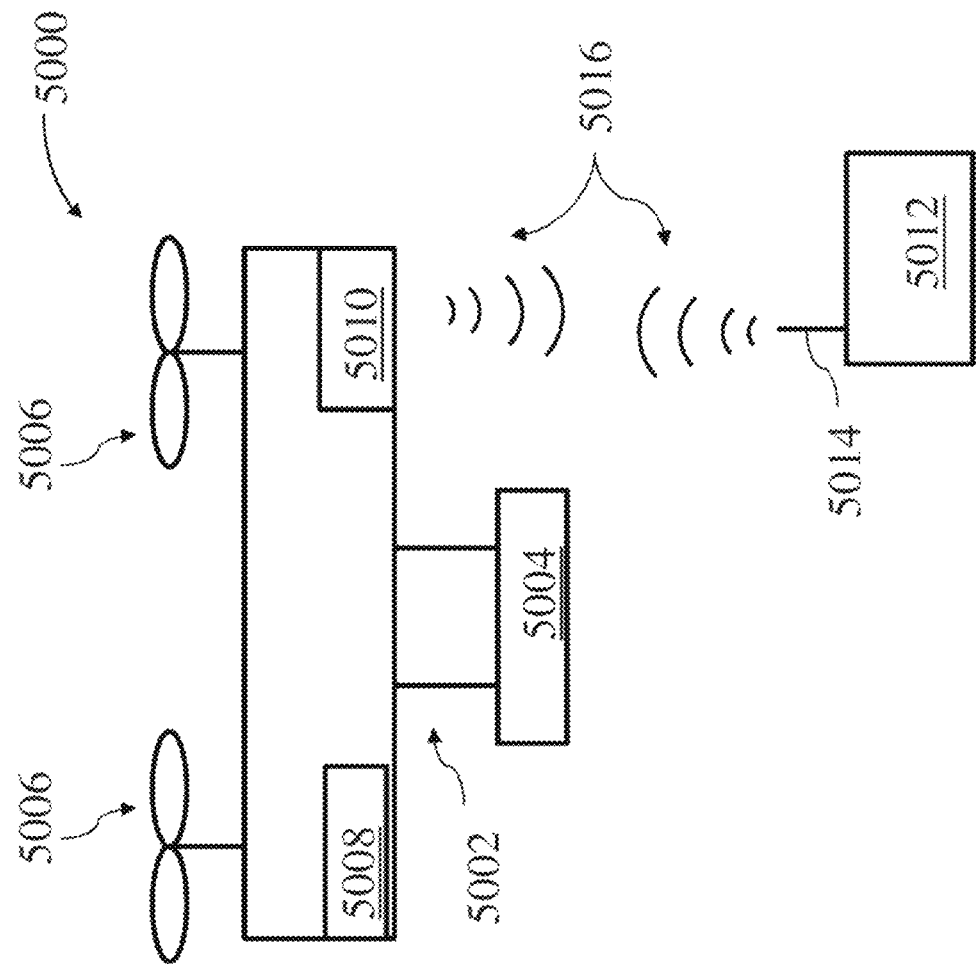
FIG. 50 illustrates a movable object in accordance with embodiments of the disclosure.

FIG. 50 illustrates a movable object 5000 in accordance with embodiments of the disclosure. Although the movable object 5000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 5004 may be provided on the movable object 5000 without requiring the carrier 5002. The movable object 5000 may include propulsion mechanisms 5006, a sensing system 5008, and a communication system 5010. In some embodiments, the payload 5004 may be any stabilizing devices as discussed before with respect to accompanying drawings.

The propulsion mechanisms 5006 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 5006 can be mounted on the movable object 5000 using any suitable means, such as a support element (e.g., a drive shaft) as described elsewhere herein. The propulsion mechanisms 5006 can be mounted on any suitable portion of the movable object 5000, such on the top, bottom, front, back, sides, or suitable combinations thereof.

In some embodiments, the propulsion mechanisms 5006 can enable the movable object 5000 to take off vertically from a surface or land vertically on a surface without requiring any horizontal movement of the movable object 5000 (e.g., without traveling down a runway). Optionally, the propulsion mechanisms 5006 can be operable to permit the movable object 5000 to hover in the air at a specified position and/or orientation. One or more of the propulsion mechanisms 5000 may be controlled independently of the other propulsion mechanisms. Alternatively, the propulsion mechanisms 5000 can be configured to be controlled simultaneously.

For example, the movable object 5000 can have multiple horizontally oriented rotors that can provide lift and/or thrust to the movable object. The multiple horizontally oriented rotors can be actuated to provide vertical takeoff, vertical landing, and hovering capabilities to the movable object 5000. In some embodiments, one or more of the horizontally oriented rotors may spin in a clockwise direction, while one or more of the horizontally rotors may spin in a counter-clockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 5000 (e.g., with respect to up to three degrees of translation and up to three degrees of rotation).

The sensing system 5008 can include one or more sensors that may sense the spatial disposition, velocity, and/or acceleration of the movable object 5000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 5008 can be used to control the spatial disposition, velocity, and/or orientation of the movable object 5000 (e.g., using a suitable processing unit and/or control module, as described below).

Alternatively, the sensing system 5008 can be used to provide data regarding the environment surrounding the movable object, such as weather conditions, proximity to potential obstacles, location of geographical features, location of manmade structures, and the like. In some embodiments, the sensing system herein may be able to provide data about the location of the payload supported by the payload stabilization assembly and connected with the constant force assembly. Therefore, by driving operations of one or more driving units, the payload together with the payload stabilization assembly may return an expected position.

The communication system 5010 enables communication with terminal 5012 having a communication system 5014 via wireless signals 5016. The communication systems 5010 and 5014 may include any number of transmitters, receivers, and/or transceivers suitable for wireless communication. The communication may be one-way communication, such that data can be transmitted in only one direction. For example, one-way communication may involve only the movable object 5000 transmitting data to the terminal 5012, or vice-versa. The data may be transmitted from one or more transmitters of the communication system 5010 to one or more receivers of the communication system 5012, or vice-versa.

Alternatively, the communication may be two-way communication, such that data can be transmitted in both directions between the movable object 5000 and the terminal 5012. The two-way communication can involve transmitting data from one or more transmitters of the communication system 5010 to one or more receivers of the communication system 5014, and vice-versa. In some embodiments, the data regarding the movement of the payload in the vertical direction may also be transmitted by the communication system 5010 to the terminal 5012. Thereby, the terminal user may be able to control the vertical movement of the payload by controlling one or more relevant motors such that the jitter or shaking in the vertical direction could be equipoised by the constant force assembly according to the embodiments of the disclosure such that a net force of the payload stabilization assembly with the payload in the vertical direction is substantially zero.

In some embodiments, the terminal 5012 can provide control data to one or more of the movable object 5000, carrier 5002, and payload 5004 and receive information from one or more of the movable object 5000, carrier 5002, and payload 5004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload.

For example, the control data may result in a modification of the location and/or orientation of the movable object (e.g., via control of the propulsion mechanisms 5006), or a movement of the payload with respect to the movable object (e.g., via control of the carrier 5002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 5008 or of the payload 5004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 5012 can be configured to control a state of one or more of the movable object 5000, carrier 5002, or payload 5004. Alternatively or in combination, the carrier 5002 and payload 5004 can also each include a communication module configured to communicate with terminal 5012, such that the terminal can communicate with and control each of the movable object 5000, carrier 5002, and payload 5004 independently.

In some embodiments, the movable object 5000 can be configured to communicate with another remote device in addition to the terminal 5012, or instead of the terminal 5012. The terminal 5012 may also be configured to communicate with another remote device as well as the movable object 5000. For example, the movable object 5000 and/or terminal 5012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 5000, receive data from the movable object 5000, transmit data to the terminal 5012, and/or receive data from the terminal 5012. Optionally, the remote device can be connected to the Internet or other telecommunications network, such that data received from the movable object 1500 and/or terminal 5012 can be uploaded to a web site or server.

Figure 51:
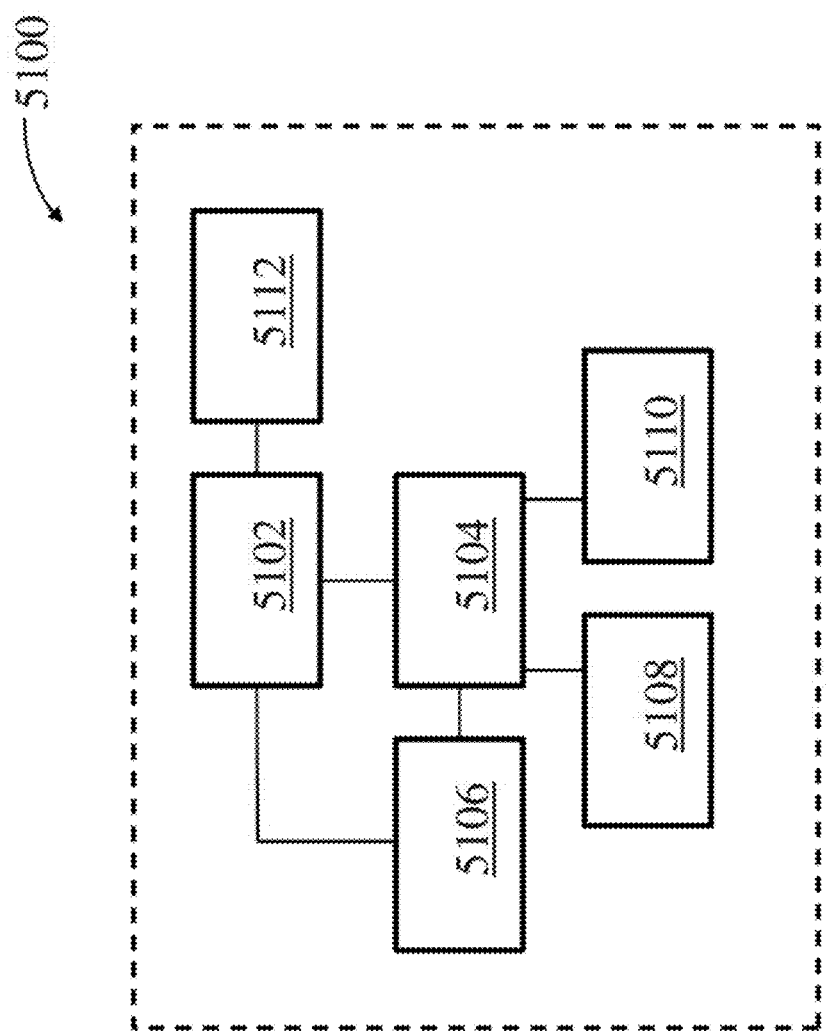
FIG. 51 is a schematic illustration by way of block diagram of a system for controlling a movable object in accordance with embodiments of the disclosure.

FIG. 51 is a schematic illustration by way of block diagram of a system 5100 for controlling a movable object, in accordance with embodiments. The system 5100 can be used in combination with any suitable embodiment of the systems, devices, and methods disclosed herein. The system 5100 can include a sensing module 5102, processing unit 5104, non-transitory computer readable medium 5106, control module 5108, and communication module 5110.

The sensing module 5102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 5102 can be operatively coupled to a processing unit 5104 having a plurality of processors. In some embodiments, the sensing module can be operatively coupled to a transmission module 5112 (e.g., a Wi-Fi image transmission module) configured to directly transmit sensing data to a suitable external device or system. For example, the transmission module 5112 can be used to transmit images captured by a camera of the sensing module 5102 to a remote terminal.

The processing unit 5104 can have one or more processors, such as a programmable processor (e.g., a central processing unit (CPU)). The processing unit 5104 can be operatively coupled to a non-transitory computer readable medium 5106. The non-transitory computer readable medium 5106 can store logic, code, and/or program instructions executable by the processing unit 5104 for performing one or more steps. The non-transitory computer readable medium can include one or more memory units (e.g., removable media or external storage such as an SD card or random access memory (RAM)). In some embodiments, data from the sensing module 5102 can be directly conveyed to and stored within the memory units of the non-transitory computer readable medium 5106. The memory units of the non-transitory computer readable medium 5106 can store logic, code and/or program instructions executable by the processing unit 5104 to perform any suitable embodiment of the methods described herein. For example, the processing unit 5104 can be configured to execute instructions causing one or more processors of the processing unit 5104 to analyze sensing data produced by the sensing module. The memory units can store sensing data from the sensing module to be processed by the processing unit 5104. In some embodiments, the memory units of the non-transitory computer readable medium 5106 can be used to store the processing results produced by the processing unit 5104.

In some embodiments, the processing unit 5104 can be operatively coupled to a control module 5108 configured to control a state of the movable object. For example, the control module 5108 can be configured to control the propulsion mechanisms of the movable object to adjust the spatial disposition, velocity, and/or acceleration of the movable object with respect to six degrees of freedom. Alternatively or in combination, the control module 5108 can control one or more of a state of a carrier, payload, or sensing module.

The processing unit 5104 can be operatively coupled to a communication module 5110 configured to transmit and/or receive data from one or more external devices (e.g., a terminal, display device, or other remote controller). Any suitable means of communication can be used, such as wired communication or wireless communication. For example, the communication module 5110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 5110 can transmit and/or receive one or more of sensing data from the sensing module 5102, processing results produced by the processing unit 5104, predetermined control data, user commands from a terminal or remote controller, and the like.

The components of the system 5100 can be arranged in any suitable configuration. For example, one or more of the components of the system 5100 can be located on the movable object, carrier, payload, terminal, sensing system, or an additional external device in communication with one or more of the above. Additionally, although FIG. 51 depicts a single processing unit 5104 and a single non-transitory computer readable medium 5106, one of skill in the art would appreciate that this is not intended to be limiting, and that the system 5100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 5100 can occur at one or more of the aforementioned locations.

Any description herein of a carrier may apply to the stabilizing devices as described or any other type of carrier.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A stabilizing device comprising:
a handle assembly including one or more grips;
a payload stabilization assembly configured to support a payload and permit the payload to rotate about at least one axis of rotation; and
a constant force assembly operably connected to the handle assembly, configured to support the payload stabilization assembly, and including a parallelogram linkage including four pivots and a resilient member obliquely arranged within the parallelogram linkage, the constant force assembly being configured to provide a force that equipoises a gravity force of the payload stabilization assembly with the payload in a vertical.

2. The stabilizing device of claim 1, wherein one attachment point of the resilient member is displaced in a horizontal direction by a negative offset distance from a vertical plane passing through longitudinal axes of two of the four pivots that are adjacent to the handle assembly, the negative offset indicating that the one attachment point is closer to the handle assembly than the vertical plane.

3. The stabilizing device of claim 2, wherein the negative offset distance is formed by connecting the one attachment point of the resilient member to a point that locates at an opposite side of the vertical plane with respect to the resilient member.

4. The stabilizing device of claim 2, wherein the negative offset distance is in a range from −0.6 mm to −0.2 mm.

5. The stabilizing device of claim 1, wherein:
the resilient member is positioned proximately along a diagonal of the parallelogram linkage; and
each of four pivots is positioned at one of four corners of the parallelogram linkage.

6. The stabilizing device of claim 5, wherein:
the four pivots include a first pivot, a second pivot, a third pivot, and a fourth pivot;
the first pivot and the second pivot are configured to be proximal to the handle assembly and to be vertically aligned with one another at an initial state, the second pivot being higher than the first pivot in the vertical direction; and
the third pivot and the fourth pivot are configured to be proximal to the payload stabilization assembly and to be vertically aligned with one another at the initial state, the fourth pivot being higher than the third pivot in the vertical direction.

7. The stabilizing device of claim 5, wherein the resilient member includes a tension spring having a first end and a second end, the first end being attached to a connecting rod connecting the first pivot and the third pivot at a first attachment point proximal to the third pivot, and the second end being attached to a connector between the second pivot and the first pivot in the vertical direction at a second attachment point.

8. The stabilizing device of claim 7, wherein the connector is moveably connected with an adjustment knob configured to be adjusted to cause the connector to move up and down in the vertical direction, thereby changing a height of the second attachment point in the vertical direction relative to the first pivot.

9. The stabilizing device of claim 8, wherein the connector includes an adjusting nut.

10. The stabilizing device of claim 7, wherein the second attachment point is offset in the vertical direction by a distance from a horizontal plane passing through longitudinal axes of the first pivot and the third pivot.

11. The stabilizing device of claim 7, wherein the first attachment point is offset in a horizontal direction by a distance from a vertical plane passing through longitudinal axes of the first pivot and the second pivot.

12. The stabilizing device of claim 7, wherein a vertical distance between the second attachment point and a center of the first pivot is variable such that the constant force assembly provides different forces for different payloads having different gravity forces.

13. The stabilizing device of claim 7, wherein the force provided by the parallelogram linkage is determined according to one or more parameters of the tension spring, structural parameters of the parallelogram linkage, and positions of the first and second attachment points.

14. The stabilizing device of claim 13, wherein the one or more parameters of the tension spring include at least one of a mean coil diameter, a wire diameter, or a number of coils.

15. The stabilizing device of claim 1, wherein the parallelogram linkage is configured to have a natural frequency that is low enough to reduce or eliminate low-frequency jitter in the vertical direction.

16. The stabilizing device of claim 1, wherein the handle assembly is attached to the parallelogram linkage by a rotating hinge configured to adjust an orientation of the payload stabilization assembly relative to the handle assembly to switch between different modes, the modes including:
that the handle assembly is perpendicular to the parallelogram linkage, and
that the handle assembly is collinear to the parallelogram linkage.

17. The stabilizing device of claim 1, wherein:
the payload is configured to be detachably connected to the payload stabilization assembly; and/or
the constant force assembly is configured to be detachably connected to the payload stabilization assembly using an interface of the constant force assembly.

18. The stabilizing device of claim 17, wherein:
the interface of the constant force assembly is a first interface;
the constant force assembly is detachably connected to the handle assembly using a second interface of the constant force assembly;
the handle assembly is configured to be disconnected from the constant force assembly and directly connected to the payload stabilization assembly to form a hand-held gimbal; and
the handle assembly is configured to be disconnected from the constant force assembly and the payload stabilization assembly and directly attached to the payload to form a hand-held imaging device.

19. The stabilizing device of claim 1, wherein the constant force assembly is configured to provide the force such that a net force of the payload stabilization assembly with the payload in the vertical direction is substantially zero.

20. A gimbal system comprising:
a payload; and
a stabilizing device including:
a handle assembly including one or more grips;
a payload stabilization assembly configured to support the payload and permit the payload to rotate about at least one axis of rotation; and
a constant force assembly operably connected to the handle assembly, configured to support the payload stabilization assembly, and including a parallelogram linkage including four pivots and a resilient member obliquely arranged within the parallelogram linkage, the constant force assembly being configured to provide a force that equipoises a gravity force of the payload stabilization assembly with the payload in a vertical direction.

* * * * *